(12) United States Patent
Wallach et al.

(10) Patent No.: US 6,292,905 B1
(45) Date of Patent: *Sep. 18, 2001

(54) METHOD FOR PROVIDING A FAULT TOLERANT NETWORK USING DISTRIBUTED SERVER PROCESSES TO REMAP CLUSTERED NETWORK RESOURCES TO OTHER SERVERS DURING SERVER FAILURE

(75) Inventors: Walter A. Wallach, Los Altos; Bruce Findlay, Palo Alto; Thomas J. Pellicer, Campbell; Michael Chrabaszcz, Milpitas, all of CA (US)

(73) Assignee: Micron Technology, Inc., Boise, ID (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/942,815

(22) Filed: Oct. 2, 1997

(Under 37 CFR 1.47)

Related U.S. Application Data

(60) Provisional application No. 60/046,327, filed on May 13, 1997.

(51) Int. Cl.[7] .................................................. G06F 11/00
(52) U.S. Cl. ................................. 714/4; 714/11; 709/239
(58) Field of Search ............................... 714/4, 7, 11, 17, 714/1, 3, 6, 10; 709/239

(56) References Cited

U.S. PATENT DOCUMENTS

| | | | |
|---|---|---|---|
| 4,057,847 | 11/1977 | Lowell et al. | 364/200 |
| 4,100,597 | 7/1978 | Fleming et al. | 364/474 |
| 4,449,182 | 5/1984 | Rubinson et al. . | |

(List continued on next page.)

FOREIGN PATENT DOCUMENTS

| | | | |
|---|---|---|---|
| 0 866 403 A1 | 9/1998 | (EP) . | |
| 04 333 118 A | 11/1992 | (JP) | G06F/1/18 |

(List continued on next page.)

OTHER PUBLICATIONS

Shanley and Anderson, PCI System Architecture, Third Edition, Chapters 15 & 16, pp. 297–328, CR 1995.
PCI Hot–Plug Specification, Preliminary Revision for Review Only, Revision 0.9, pp. i–vi, and 1–25, Mar. 5, 1997.

(List continued on next page.)

*Primary Examiner*—Thomas Lee
*Assistant Examiner*—Nguyễn Ãuân Nguyên
(74) *Attorney, Agent, or Firm*—Knobbe, Martens, Olson & Bear, LLP

(57) ABSTRACT

The method of the current invention provides a fault tolerant access to a network resource. A replicated network directory database operates in conjunction with server resident processes to remap a network resource in the event of a server failure. The records/objects in the replicated database contain for each network resource, a primary and a secondary server affiliation. Initially, all users access a network resource through the server identified in the replicated database as being the primary server for the network resource. When server resident processes detect a failure of the primary server, the replicated database is updated to reflect the failure of the primary server, and to change the affiliation of the network resource from its primary to its backup server. This remapping occurs transparently to whichever user/client is accessing the network resource. As a result of the remapping, all users access the network resource through the server identified in the replicated database as the backup server for the resource. When the server resident processes detect a return to service of the primary server, the replicated database is again updated to reflect the resumed operation of the primary server. This remapping of network resource affiliations also occurs transparently to whichever user/client is accessing the network resource, and returns the resource to its original fault tolerant state.

28 Claims, 19 Drawing Sheets

U.S. PATENT DOCUMENTS

| | | | |
|---|---|---|---|
| 4,672,535 | 6/1987 | Katzman et al. | 364/200 |
| 4,692,918 | 9/1987 | Elliott et al. | 370/85 |
| 4,695,946 | 9/1987 | Andreasen et al. | 364/200 |
| 4,707,803 | 11/1987 | Anthony, Jr. et al. | |
| 4,769,764 | 9/1988 | Levanon | 364/708 |
| 4,774,502 | 9/1988 | Kimura | 340/501 |
| 4,821,180 | 4/1989 | Gerety et al. | 364/200 |
| 4,835,737 | 5/1989 | Herrig et al. | |
| 4,894,792 | 1/1990 | Mitchell et al. | 364/708 |
| 4,949,245 | 8/1990 | Martin et al. | |
| 4,999,787 | 3/1991 | McNally et al. | |
| 5,006,961 | 4/1991 | Monico | |
| 5,007,431 | 4/1991 | Donehoo, III | 128/696 |
| 5,033,048 | 7/1991 | Pierce et al. | 371/21.2 |
| 5,051,720 | 9/1991 | Kittirutsunetorn | 340/310 R |
| 5,073,932 | 12/1991 | Yossifor et al. | 380/23 |
| 5,103,391 | 4/1992 | Barrett | 364/133 |
| 5,118,970 | 6/1992 | Olson et al. | 307/443 |
| 5,121,500 | 6/1992 | Arlington et al. | 395/750 |
| 5,123,017 | 6/1992 | Simpkins et al. | 371/15.1 |
| 5,136,708 | 8/1992 | Lapourtre et al. | 395/650 |
| 5,136,715 | 8/1992 | Hirose et al. | 395/775 |
| 5,138,619 | 8/1992 | Fasang et al. | 371/21.1 |
| 5,157,663 * | 10/1992 | Major et al. | 371/9.1 |
| 5,210,855 | 5/1993 | Bartol | 395/500 |
| 5,222,897 | 6/1993 | Collins et al. | 439/157 |
| 5,245,615 | 9/1993 | Treu | 371/16.5 |
| 5,247,683 | 9/1993 | Holmes et al. | 395/700 |
| 5,253,348 | 10/1993 | Scalise | 395/325 |
| 5,261,094 | 11/1993 | Everson et al. | 395/600 |
| 5,265,098 | 11/1993 | Mattson et al. | 371/11.1 |
| 5,266,838 | 11/1993 | Gerner | 307/19 |
| 5,269,011 | 12/1993 | Yanai et al. | |
| 5,272,382 | 12/1993 | Heald et al. | 307/66 |
| 5,272,584 | 12/1993 | Austruy et al. | 631/58 |
| 5,276,814 | 1/1994 | Bourke et al. | 395/275 |
| 5,276,863 | 1/1994 | Heider | 395/575 |
| 5,277,615 | 1/1994 | Hastings et al. | 439/377 |
| 5,280,621 | 1/1994 | Barnes et al. | 395/800 |
| 5,283,905 | 2/1994 | Saadeh et al. | 395/750 |
| 5,307,354 | 4/1994 | Cramer et al. | |
| 5,311,397 | 5/1994 | Harshberger et al. | 361/683 |
| 5,311,451 | 5/1994 | Barrett | 364/550 |
| 5,317,693 | 5/1994 | Cuenod et al. | |
| 5,329,625 | 7/1994 | Kannan et al. | |
| 5,337,413 | 8/1994 | Lui et al. | 395/275 |
| 5,351,276 | 9/1994 | Doll, Jr. et al. | |
| 5,367,670 | 11/1994 | Ward et al. | 395/575 |
| 5,379,184 | 1/1995 | Barraza et al. | 361/685 |
| 5,379,409 | 1/1995 | Ishikawa | 395/575 |
| 5,386,567 | 1/1995 | Lien et al. | |
| 5,388,267 | 2/1995 | Chan et al. | 395/700 |
| 5,402,431 | 3/1995 | Saadeh et al. | 371/67.1 |
| 5,404,494 | 4/1995 | Garney | |
| 5,423,025 | 6/1995 | Goldman et al. | 395/575 |
| 5,430,717 | 7/1995 | Fowler et al. | 370/58.2 |
| 5,430,845 | 7/1995 | Rimmer et al. | 395/275 |
| 5,432,715 | 7/1995 | Shigematsu et al. | 364/551.01 |
| 5,432,946 | 7/1995 | Allard et al. | 395/750 |
| 5,438,678 | 8/1995 | Smith | 395/750 |
| 5,440,748 | 8/1995 | Sekine et al. | |
| 5,448,723 * | 9/1995 | Rowett | 714/4 |
| 5,455,933 | 10/1995 | Schieve et al. | 395/183.03 |
| 5,460,441 | 10/1995 | Hastings et al. | 312/298 |
| 5,463,768 | 10/1995 | Schieve et al. | 395/650 |
| 5,465,349 | 11/1995 | Geronimi et al. | 364/550 |
| 5,471,617 | 11/1995 | Farrand et al. | 395/700 |
| 5,471,634 | 11/1995 | Giorgio et al. | 395/600 |
| 5,473,499 | 12/1995 | Weir | 361/58 |
| 5,483,419 | 1/1996 | Kaczeus, Sr. et al. | |
| 5,485,550 | 1/1996 | Dalton | 395/51 |
| 5,485,607 | 1/1996 | Lomet et al. | 395/600 |
| 5,487,148 | 1/1996 | Komori et al. | |
| 5,491,791 | 2/1996 | Glowny et al. | |
| 5,493,574 | 2/1996 | McKinley | |
| 5,493,666 | 2/1996 | Fitch | |
| 5,513,314 * | 4/1996 | Kandasamy et al. | 714/6 |
| 5,513,339 | 4/1996 | Agrawal et al. | 395/500 |
| 5,515,515 | 5/1996 | Kennedy et al. | 395/283 |
| 5,517,646 | 5/1996 | Piccirillo et al. | |
| 5,519,851 | 5/1996 | Bender et al. | 395/500 |
| 5,526,289 | 6/1996 | Dinh et al. | 364/557 |
| 5,528,409 | 6/1996 | Cucci et al. | 359/171 |
| 5,530,810 | 6/1996 | Bowman | 395/283 |
| 5,533,193 | 7/1996 | Roscoe | 395/183.15 |
| 5,533,198 | 7/1996 | Thorson | 395/200.15 |
| 5,535,326 | 7/1996 | Baskey et al. | 395/182.02 |
| 5,539,883 | 7/1996 | Allon et al. | 395/200.11 |
| 5,542,055 | 7/1996 | Amini et al. | 395/281 |
| 5,546,272 | 8/1996 | Moss et al. | 361/687 |
| 5,548,712 | 8/1996 | Larson et al. | 395/182.05 |
| 5,555,510 | 9/1996 | Verseput et al. | |
| 5,559,764 | 9/1996 | Chen et al. | 396/30 |
| 5,559,958 | 9/1996 | Farrand et al. | 395/183.03 |
| 5,559,965 | 9/1996 | Oztaskin et al. | |
| 5,560,022 | 9/1996 | Dunstan et al. | 395/750 |
| 5,564,024 | 10/1996 | Pemberton | 395/283 |
| 5,566,299 * | 10/1996 | Billings et al. | 714/4 |
| 5,566,339 | 10/1996 | Perholtz et al. | 395/750 |
| 5,568,610 | 10/1996 | Brown | |
| 5,568,619 | 10/1996 | Blackledge et al. | |
| 5,572,403 | 11/1996 | Mills | 361/695 |
| 5,577,205 | 11/1996 | Hwang et al. | |
| 5,579,487 | 11/1996 | Meyerson et al. | 395/280 |
| 5,579,491 | 11/1996 | Jeffries et al. | 395/283 |
| 5,579,528 | 11/1996 | Register | 395/671 |
| 5,581,712 | 12/1996 | Herrman | |
| 5,581,714 | 12/1996 | Amini et al. | |
| 5,584,030 | 12/1996 | Husak et al. | 395/750 |
| 5,586,250 | 12/1996 | Carbonneau et al. | 395/183.2 |
| 5,588,121 | 12/1996 | Reddin et al. | 395/200.15 |
| 5,588,144 | 12/1996 | Inoue et al. | |
| 5,592,610 | 1/1997 | Chittor | 395/182.02 |
| 5,592,611 * | 1/1997 | Midgely et al. | 714/4 |
| 5,596,711 | 1/1997 | Burckhartt et al. | 395/182.21 |
| 5,598,407 | 1/1997 | Bud et al. | 370/330 |
| 5,602,758 | 2/1997 | Lincoln et al. | 364/505 |
| 5,604,873 | 2/1997 | Fite et al. | 395/283 |
| 5,606,672 | 2/1997 | Wade | |
| 5,608,865 * | 3/1997 | Midgely et al. | 714/1 |
| 5,608,876 | 3/1997 | Cohen et al. | |
| 5,615,207 | 3/1997 | Gephardt et al. | |
| 5,621,159 | 4/1997 | Brown et al. | 73/9 |
| 5,621,892 | 4/1997 | Cook | 395/200.1 |
| 5,622,221 | 4/1997 | Genga, Jr. et al. | 165/208 |
| 5,625,238 | 4/1997 | Ady et al. | 307/147 |
| 5,627,962 | 5/1997 | Goodrum et al. | 395/182.11 |
| 5,628,028 | 5/1997 | Michelson | 395/825 |
| 5,630,076 | 5/1997 | Saulpaugh et al. | 395/284 |
| 5,631,847 | 5/1997 | Kikinis | 364/514 R |
| 5,632,021 | 5/1997 | Jennings et al. | 395/309 |
| 5,636,341 | 6/1997 | Matsushita et al. | 395/182.11 |
| 5,638,289 | 6/1997 | Yamada et al. | 364/489 |
| 5,644,470 | 7/1997 | Benedict et al. | |
| 5,644,731 | 7/1997 | Liencres et al. | 395/283 |
| 5,651,006 | 7/1997 | Fujino et al. | |
| 5,652,832 | 7/1997 | Kane et al. | |
| 5,652,833 * | 7/1997 | Takizawa et al. | 714/10 |
| 5,652,839 | 7/1997 | Giorgio et al. | 395/200.11 |
| 5,652,892 | 7/1997 | Ugajin | 395/750 |
| 5,652,908 | 7/1997 | Douglas et al. | 395/800 |

| Patent No. | Date | Name | Ref |
|---|---|---|---|
| 5,655,081 | 8/1997 | Bonnell et al. . | |
| 5,655,083 | 8/1997 | Bagley | 395/182.31 |
| 5,655,148 | 8/1997 | Richman et al. . | |
| 5,659,682 | 8/1997 | Devarakonda et al. . | |
| 5,664,118 | 9/1997 | Nishigaki et al. | 395/283 |
| 5,664,119 | 9/1997 | Jeffries et al. . | |
| 5,666,538 | 9/1997 | DeNicola . | |
| 5,668,943 * | 9/1997 | Attanasio et al. | 714/4 |
| 5,668,992 | 9/1997 | Hammer et al. | 395/651 |
| 5,669,009 | 9/1997 | Buktenica et al. | 395/800.35 |
| 5,671,371 | 9/1997 | Kondo et al. | 395/306 |
| 5,675,723 * | 10/1997 | Ekrot et al. | 714/4 |
| 5,680,288 | 10/1997 | Carey et al. . | |
| 5,682,328 | 10/1997 | Roeber et al. | 364/550 |
| 5,684,671 | 11/1997 | Hobbs et al. . | |
| 5,689,637 | 11/1997 | Johnson et al. . | |
| 5,696,895 * | 12/1997 | Hemphill et al. | 714/4 |
| 5,696,899 | 12/1997 | Kalwitz . | |
| 5,696,949 | 12/1997 | Young | 395/551 |
| 5,696,970 | 12/1997 | Sandage et al. . | |
| 5,701,417 | 12/1997 | Lewis et al. | 395/200.16 |
| 5,704,031 | 12/1997 | Mikami et al. | 395/182.02 |
| 5,708,775 | 1/1998 | Nakamura | 395/185.01 |
| 5,708,776 * | 1/1998 | Kikinis | 714/10 |
| 5,712,754 | 1/1998 | Sides et al. | 361/58 |
| 5,715,456 | 2/1998 | Bennett et al. | 395/652 |
| 5,717,570 | 2/1998 | Kikinis | 361/685 |
| 5,721,935 | 2/1998 | DeSchepper et al. | 395/750 |
| 5,724,529 | 3/1998 | Smith et al. . | |
| 5,726,506 | 3/1998 | Wood . | |
| 5,727,207 | 3/1998 | Gates et al. | 395/651 |
| 5,732,266 | 3/1998 | Moore et al. | 395/651 |
| 5,737,708 | 4/1998 | Grob et al. | 455/557 |
| 5,737,747 * | 4/1998 | Vishlitzky et al. | 711/118 |
| 5,740,378 | 4/1998 | Rehl et al. . | |
| 5,742,514 | 4/1998 | Bonola | 364/492 |
| 5,742,833 | 4/1998 | Dea et al. | 395/750.05 |
| 5,747,889 | 5/1998 | Raynham et al. . | |
| 5,748,426 | 5/1998 | Bedingfield et al. . | |
| 5,752,164 | 5/1998 | Jones | 455/33.1 |
| 5,754,396 | 5/1998 | Felcman et al. | 361/683 |
| 5,754,449 | 5/1998 | Hoshal et al. | 364/550 |
| 5,754,797 | 5/1998 | Takahashi . | |
| 5,758,165 | 5/1998 | Shuff | 395/712 |
| 5,758,352 | 5/1998 | Reynolds et al. | 707/200 |
| 5,761,033 | 6/1998 | Wilhelm . | |
| 5,761,045 | 6/1998 | Olson et al. . | |
| 5,761,085 | 6/1998 | Giorgio | 364/505 |
| 5,761,462 | 6/1998 | Neal et al. . | |
| 5,761,707 | 6/1998 | Aiken et al. | 711/118 |
| 5,764,924 | 6/1998 | Hong | 395/281 |
| 5,764,968 | 6/1998 | Ninomiya . | |
| 5,765,008 | 6/1998 | Desai et al. . | |
| 5,765,198 | 6/1998 | McCrocklin et al. . | |
| 5,767,844 | 6/1998 | Stoye | 345/212 |
| 5,768,541 | 6/1998 | Pan-Ratzlaff . | |
| 5,768,542 | 6/1998 | Enstrom et al. . | |
| 5,771,343 * | 6/1998 | Hafner et al. | 714/4 |
| 5,774,640 * | 6/1998 | Kurio | 714/4 |
| 5,774,645 | 6/1998 | Beaujard et al. | 395/183.01 |
| 5,774,741 | 6/1998 | Choi . | |
| 5,777,897 | 7/1998 | Giorgio | 364/557 |
| 5,778,197 | 7/1998 | Dunham | 395/284 |
| 5,781,703 | 7/1998 | Desai et al. . | |
| 5,781,716 * | 7/1998 | Hemphill, II et al. | 714/4 |
| 5,781,744 | 7/1998 | Johnson et al. | 395/283 |
| 5,781,767 | 7/1998 | Inoue et al. . | |
| 5,781,798 | 7/1998 | Beatty et al. . | |
| 5,784,383 * | 7/1998 | Meaney | 371/22.4 |
| 5,784,555 | 7/1998 | Stone | 395/200.5 |
| 5,784,576 | 7/1998 | Guthrie et al. . | |
| 5,787,019 | 7/1998 | Knight et al. | 364/550 |
| 5,787,459 | 7/1998 | Stallmo et al. | 711/112 |
| 5,787,491 | 7/1998 | Merkin et al. | 711/173 |
| 5,790,775 * | 8/1998 | Marks et al. | 714/7 |
| 5,790,831 | 8/1998 | Lin et al. . | |
| 5,793,948 | 8/1998 | Asahi et al. | 395/184.01 |
| 5,793,987 | 8/1998 | Quackenbush et al. . | |
| 5,794,035 | 8/1999 | Golub et al. . | |
| 5,796,185 | 8/1998 | Takata et al. . | |
| 5,796,580 | 8/1998 | Komatsu et al. | 361/687 |
| 5,796,934 | 8/1998 | Bhanot et al. | 395/182.02 |
| 5,796,981 | 8/1998 | Abudayyeh et al. . | |
| 5,797,023 | 8/1998 | Berman et al. | 395/750.06 |
| 5,798,828 | 8/1998 | Thomas et al. . | |
| 5,799,036 | 8/1998 | Staples . | |
| 5,799,196 | 8/1998 | Flannery | 395/750.03 |
| 5,801,921 | 9/1998 | Miller . | |
| 5,802,269 | 9/1998 | Poisner et al. . | |
| 5,802,298 | 9/1998 | Imai et al. | 395/200.47 |
| 5,802,305 | 9/1998 | McKaughan et al. | 395/200.57 |
| 5,802,324 | 9/1998 | Wunderlich et al. | 395/281 |
| 5,802,393 | 9/1998 | Begun et al. . | |
| 5,802,552 | 9/1998 | Fandrich et al. . | |
| 5,802,592 | 9/1998 | Chess et al. | 711/164 |
| 5,803,357 | 9/1998 | Lakin | 236/78 B |
| 5,805,804 | 9/1998 | Laursen et al. | 395/200.02 |
| 5,805,834 | 9/1998 | McKinley et al. . | |
| 5,809,224 | 9/1998 | Schultz et al. . | |
| 5,809,256 | 9/1998 | Najemy | 395/283 |
| 5,809,287 | 9/1998 | Stupek, Jr. et al. | 395/500 |
| 5,809,311 | 9/1998 | Jones | 395/750.01 |
| 5,809,555 | 9/1998 | Hobson | 711/172 |
| 5,812,748 * | 9/1998 | Ohran et al. | 714/11 |
| 5,812,750 | 9/1998 | Dev et al. . | |
| 5,812,757 | 9/1998 | Okamoto et al. . | |
| 5,812,858 | 9/1998 | Nookala et al. . | |
| 5,815,117 | 9/1998 | Kolanek . | |
| 5,815,647 | 9/1998 | Buckland et al. | 395/182.01 |
| 5,815,651 * | 9/1998 | Litt | 714/10 |
| 5,815,652 | 9/1998 | Ote et al. . | |
| 5,821,596 | 10/1998 | Miu et al. | 257/419 |
| 5,822,547 | 10/1998 | Boesch et al. . | |
| 5,826,043 | 10/1998 | Smith et al. | 395/281 |
| 5,829,046 * | 10/1998 | Tzelnic et al. | 711/162 |
| 5,835,719 | 11/1998 | Gibson et al. | 395/200.51 |
| 5,835,738 | 11/1998 | Blackledge, Jr. et al. . | |
| 5,838,932 | 11/1998 | Alzien | 395/308 |
| 5,841,964 | 11/1998 | Yamaguchi | 395/113.21 |
| 5,841,991 | 11/1998 | Russell . | |
| 5,845,061 * | 12/1998 | Miyamoto et al. | 714/4 |
| 5,845,095 | 12/1998 | Reed et al. | 395/283 |
| 5,850,546 | 12/1998 | Kim | 395/651 |
| 5,852,720 | 12/1998 | Gready et al. . | |
| 5,852,724 * | 12/1998 | Glenn, II et al. | 714/7 |
| 5,857,074 | 1/1999 | Johnson . | |
| 5,857,102 | 1/1999 | McChesney et al. | 395/653 |
| 5,864,653 | 1/1999 | Tavallaei et al. | 315/181 |
| 5,864,654 * | 1/1999 | Marchant | 714/3 |
| 5,864,713 | 1/1999 | Terry | 395/872 |
| 5,867,730 | 2/1999 | Leyda | 395/830 |
| 5,875,307 | 2/1999 | Ma et al. | 395/281 |
| 5,875,308 | 2/1999 | Egan et al. | 395/283 |
| 5,875,310 | 2/1999 | Buckland et al. | 395/306 |
| 5,878,237 | 3/1999 | Olarig | 395/308 |
| 5,878,238 | 3/1999 | Gan et al. | 395/308 |
| 5,881,311 | 3/1999 | Woods | 395/824 |
| 5,884,027 | 3/1999 | Garbus et al. | 395/200.8 |
| 5,884,049 | 3/1999 | Atkinson | 395/281 |
| 5,886,424 | 3/1999 | Kim | 307/64 |
| 5,889,965 | 3/1999 | Wallach et al. | 395/283 |
| 5,892,898 | 4/1999 | Fujii et al. | 395/185.1 |

| | | | |
|---|---|---|---|
| 5,892,915 | * 4/1999 | Duso et al. | 709/219 |
| 5,892,928 | 4/1999 | Wallach et al. | 395/283 |
| 5,893,140 | * 4/1999 | Vahalia et al. | 711/118 |
| 5,898,846 | 4/1999 | Kelly | 395/284 |
| 5,898,888 | 4/1999 | Guthrie et al. | 395/308 |
| 5,905,867 | 5/1999 | Giorgio | 395/200.54 |
| 5,907,672 | 5/1999 | Matze et al. | 395/182.06 |
| 5,909,568 | 6/1999 | Nason | 395/500 |
| 5,911,779 | 6/1999 | Stallmo et al. | 714/6 |
| 5,913,034 | 6/1999 | Malcolm | 395/200.53 |
| 5,922,060 | 7/1999 | Goodrum | 710/103 |
| 5,930,358 | 7/1999 | Rao | 380/4 |
| 5,935,262 | 8/1999 | Barrett et al. | 714/46 |
| 5,936,960 | 8/1999 | Stewart | 370/438 |
| 5,938,751 | 8/1999 | Tavallaei et al. | 710/103 |
| 5,941,996 | 8/1999 | Smith et al. | 714/47 |
| 5,964,855 | 10/1999 | Bass et al. | 710/103 |
| 5,983,349 | 11/1999 | Kodama et al. | 713/200 |
| 5,987,554 | 11/1999 | Liu et al. | 710/129 |
| 5,987,621 | 11/1999 | Duso et al. | 714/4 |
| 5,987,627 | 11/1999 | Rawlings, III | 714/48 |
| 6,012,130 | 1/2000 | Beyda et al. | 711/173 |
| 6,038,624 | 3/2000 | Chan et al. | 710/103 |

FOREIGN PATENT DOCUMENTS

| | | | |
|---|---|---|---|
| 05 233 110 A | 9/1993 | (JP) | G06F/3/00 |
| 07 093 064 A | 4/1995 | (JP) | G06F/1/26 |
| 07 261 874 A | 10/1995 | (JP) | G06F/1/18 |

OTHER PUBLICATIONS

SES SCSI–3 Enclosure Services, X3T10/Project 1212–D/Rev 8a, pp. i, iii–x, 1–76, and I–1 (index), Jan. 16, 1997.
Compaq Computer Corporation, Technology Brief, pp. 1–13, Dec. 1996, "Where Do I Plug the Cable? Solving the Logical–Physical Slot Numbering Problem."
ftp.cdrom.com/pub/os2/diskutil/, PHDX software, phdx.zip download, Mar. 1995, "Parallel Hard Disk Xfer."
Cmasters, Usenet post to microsoft.public.windowsnt.setup, Aug. 1997, "Re: FDISK switches."
Hildebrand, N., Usenet post to comp.msdos.programmer, May 1995, "Re: Structure of disk partition into."
Lewis, L., Usenet post to alt.msdos.batch, Apr. 1997, "Re: Need help with automating FDISK and FORMAT."
Netframe, http://www.netframe–support.com/technology/datasheets/data.htm, before Mar. 1997, "Netframe Cluster-System 9008 Data Sheet."
Simos, M., Usenet post to comp.os.msdos.misc, Apr. 1997, "Re: Auto FDISK and FORMAT."
Wood, M. H., Usenet post to comp.os.netware.misc, Aug. 1996, "Re: Workstation duplication method for WIN95."
Lyons, Computer Reseller News, Issue 721, pp. 61–62, Feb. 3, 1997, "ACC Releases Low–Cost Solution for ISPs."
M2 Communications, M2 Presswire, 2 pages, Dec. 19, 1996, "Novell IntranetWare Supports Hot Pluggable PCI from NetFRAME."
Rigney, PC Magazine, 14(17): 375–379, Oct. 10, 1995, "The One for the Road (Mobile–aware capabilities in Windows 95)."
Shanley, and Anderson, PCI System Architecture, Third Edition, p. 382, Copyright 1995.
Gorlick, M., Conf. Proceedings: ACM/ONR Workshop on Parallel and Distributed Debugging, pp. 175–181, 1991, "The Flight Recorder: An Architectural Aid for System Monitoring."
IBM Technical Disclosure Bulletin, 92A+62947, pp. 391–394, Oct. 1992, Method for Card Hot Plug Detection and Control.
Davis, T, Usenet post to alt.msdos.programmer, Apr. 1997, "Re: How do I create an FDISK batch file?"
Davis, T., Usenet post to alt.msdos.batch, Apr. 1997, "Re: Need help with automating FDISK and FORMAT . . . ".
NetFrame Systems Incorporated, Doc. No. 78–1000226–01, pp. 1–2, 5–8, 359–404, and 471–512, Apr. 1996, "NetFrame Clustered Multiprocessing Software: NW0496 DC–ROM for Novel® NetWare® 4.1 SMP, 4.1, and 3.12."
Shanley, and Anderson, PCI System Architecture, Third Edition, Chapter 15, pp. 297–302, Copyright 1995, "Intro To Configuration Address Space."
Shanley, and Anderson, PCI System Architecture, Third Edition, Chapter 16, pp. 303–328, Copyright 1995, "Configuration Transactions."
Sun Microsystems Computer Company, Part No. 802–5355–10, Rev. A, May 1996, "Solstice SyMON User's Guid."
Sun Microsystems, Part No. 802–6569–11, Release 1.0.1, Nov. 1996, "Remote Systems Diagnostics Installation & User Guide."
Haban, D. & D. Wybranietz, *IEEE Transaction on Software Engineering*, 16(2):197–211, Feb. 1990, "A Hybrid Monitor for Behavior and Performance Analysis of Distributed Systems."

* cited by examiner

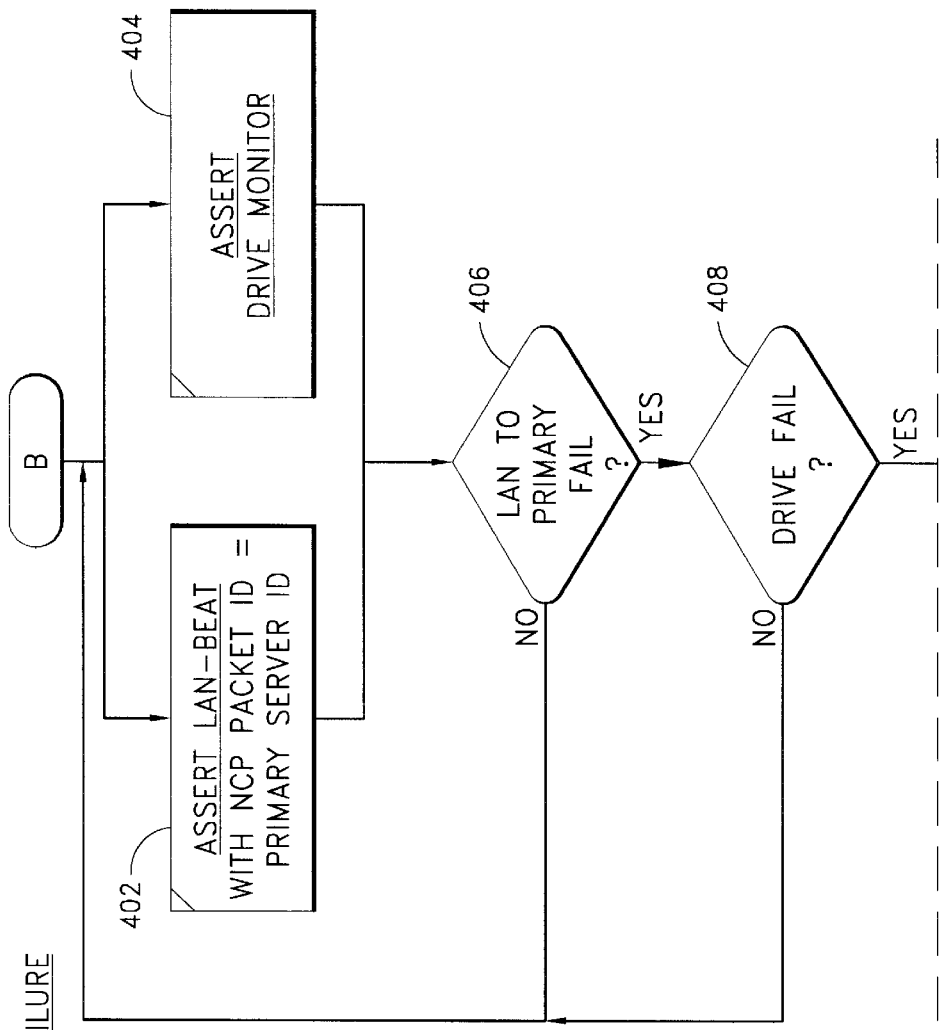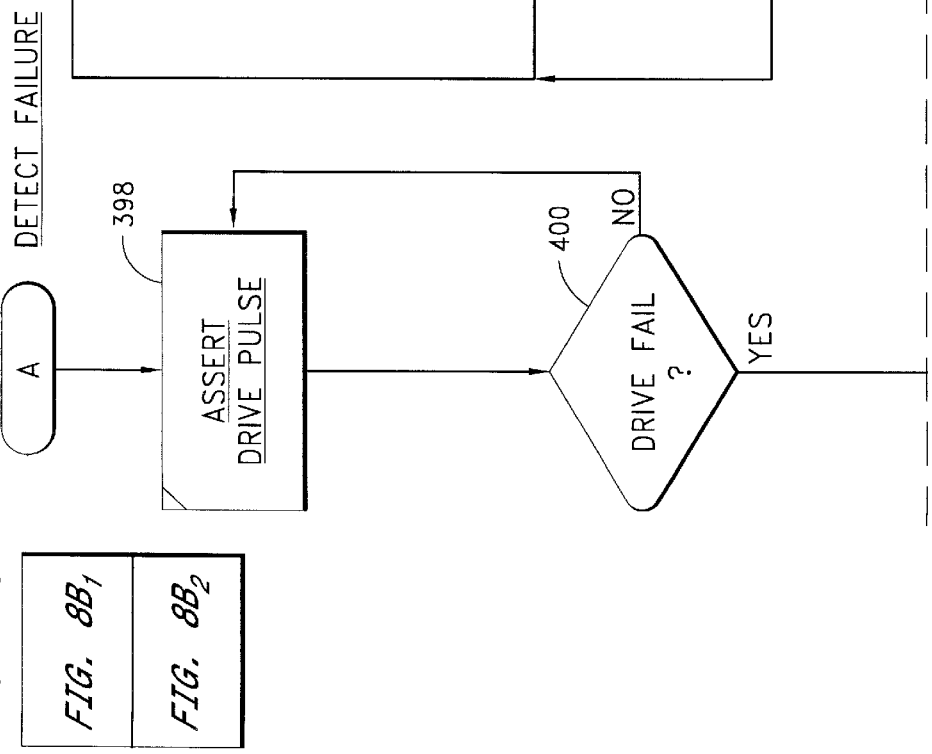
FIG. 8B₁

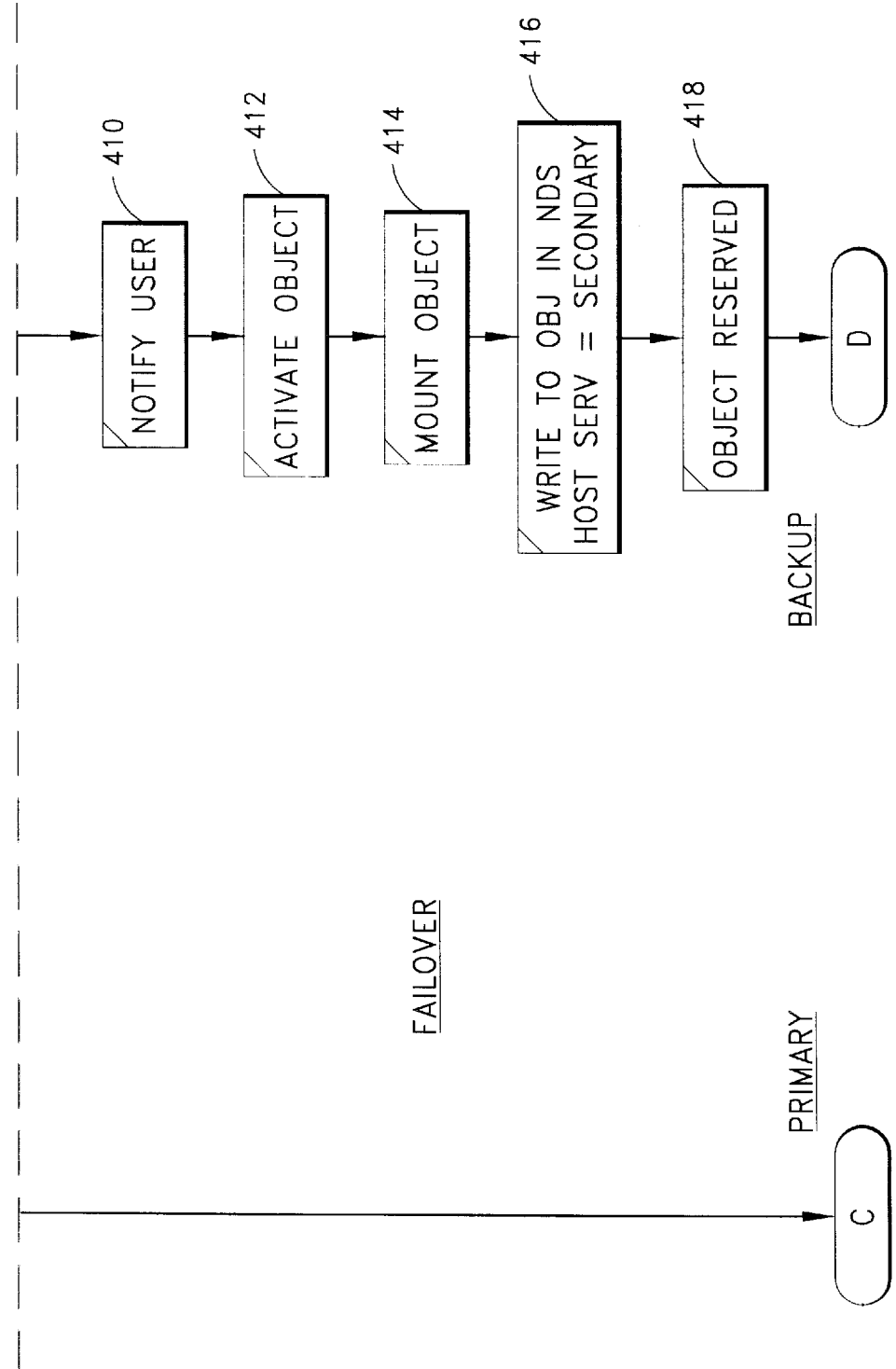
FIG. 8B₂

METHOD FOR PROVIDING A FAULT TOLERANT NETWORK USING DISTRIBUTED SERVER PROCESSES TO REMAP CLUSTERED NETWORK RESOURCES TO OTHER SERVERS DURING SERVER FAILURE

PRIORITY

The benefit under 35 U.S.C. §119(e) of the following U.S. Provisional Application entitled "Clustering Of Computer Systems Using Uniform Object Naming And Distributed Software For Locating Objects," application Ser. No. 60/046,327, filed on May 13, 1997, is hereby claimed.

APPENDICES

Appendix A, which forms a part of this disclosure, is a list of commonly owned copending U.S. patent applications. Each one of the applications listed in Appendix A is hereby incorporated herein in its entirety by reference thereto.

Appendix B, which forms part of this disclosure, is a copy of the U. S. provisional patent application filed May 13, 1997, entitled "Clustering Of Computer Systems Using Uniform Object Naming And Distributed Software For Locating Objects," and assigned application Ser. No. 60/046,327.

COPYRIGHT AUTHORIZATION

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of Invention

The present invention pertains to computer networks. More particularly, this invention relates to improving the ability of a network to route around faulty components.

2. Description of Related Art

As computer systems and networks become more complex, various systems for promoting fault tolerance have been devised. To prevent network down-time due to power failure, uninterrupted power supplies (UPS) have been developed. A UPS is basically a rechargeable battery to which a workstation or server is connected. In the event of a power failure the workstation or server is maintained in operation by the rechargeable battery until such time as the power resumes.

To prevent network down-time due to failure of a storage device, data mirroring was developed. Data mirroring provides for the storage of data on separate physical devices operating in parallel with respect to a file server. Duplicate data is stored on separate drives. Thus, when a single drive fails the data on the mirrored drive may still be accessed.

To prevent network down-time due to a print/file server, server mirroring has been developed. Server mirroring as it is currently implemented requires a primary server and storage device, a backup server and storage device, and a unified operating system linking the two. An example of a mirrored server product is the Software Fault Tolerance level 3 (SFT III) product by Novell Inc., 1555 North Technology Way, Orem, Utah, as an add-on to its NetWare® 4.x product.

SFT III maintains servers in an identical state of data update. It separates hardware-related operating system (OS) functions on the mirrored servers so that a fault on one hardware platform does not affect the other. The server OS is designed to work in tandem with two servers. One server is designated as a primary server, and the other is a secondary server. The primary server is the main point of update; the secondary server is in a constant state of readiness to take over. Both servers receive all updates through a special link called a mirrored server link (MSL), which is dedicated to this purpose. The servers also communicate over the local area network (LAN) that they share in common, so that one knows if the other has failed even if the MSL has failed. When a failure occurs, the second server automatically takes over without interrupting communications in any user-detectable way. Each server monitors other server's NetWare Core Protocol (NCP) acknowledgments over the LAN to see that all the requests are serviced and that OSs are constantly maintained in a mirrored state.

When the primary server fails, the secondary server detects the failure and immediately takes over as the primary server. The failure is detected in one or both of two ways: the MSL link generates an error condition when no activity is noticed, or the servers communicate over the LAN, each one monitoring the other's NCP acknowledgment. The primary server is simply the first server of the pair that is brought up. It then becomes the server used at all times and it processes all requests. When the primary server fails, the secondary server is immediately substituted as the primary server with identical configurations. The switch-over is handled entirely at the server end, and work continues without any perceivable interruption.

Power supply backup, data mirroring, and server mirroring all increase security against down time caused by a failed hardware component, but they all do so at considerable cost. Each of these schemes requires the additional expense and complexity of standby hardware, that is not used unless there is a failure in the network. Mirroring, while providing redundancy to allow recovery from failure, does not allow the redundant to be used to improve cost/performance of the network.

What is needed is a fault tolerant system for computer networks that can provide all the functionality of UPS, disk mirroring, or server mirroring without the added cost and complexity of standby/additional hardware. What is needed is a fault tolerant system for computer networks which smoothly interfaces with existing network systems.

SUMMARY OF THE INVENTION

In an embodiment of the invention, the method comprises the acts of:

providing a network resource database, the database includes individual records corresponding to clustered network resources, and for the clustered resources, the database includes a first record corresponding to the network resource, and the first record identifies the primary server for the network resource as the first server;

selecting, on the basis of the first record, the first server to provide service to the client workstation with respect to that clustered network resource;

recognizing the backup server for that clustered network resource as the second server;

detecting a failure of the first server; and routing communications between the client workstation and the network resource via the second server, responsive to the recognizing and detecting acts.

In another embodiment of the invention, the method comprises the additional acts of:

identifying in the first record, the primary server for the network resource as the first server;

discovering a recovery of the first server; and re-routing communications between the client workstation and the network resource via the first server, responsive to the identifying and discovering acts.

DESCRIPTION OF FIGURES

FIG. 8A–C are process flow diagrams showing the authentication, detection, fail-over, recovery detection, and fail-back processes of the current invention.

DETAILED DESCRIPTION

The method of the current invention provides a fault tolerant network without hardware mirroring. The invention involves an enhanced replicated network directory database which operates in conjunction with server resident processes to remap network resources in the event of a server failure. In some embodiments, the enhanced network directory database is replicated throughout all servers in the cluster. The records/objects in the enhanced database contain for at least 1 clustered resource, a primary and a secondary server affiliation. Initially, all users access a clustered resource through the server identified in the enhanced database as being the primary server for that clustered resource. When server resident processes detect a failure of the primary server the enhanced database is updated to reflect the failure of the primary server, and to change the affiliation of the resource from its primary to its backup server. The updating and remapping is accomplished by server resident processes which detect failure of the primary server, and remap the network resource server affiliation. This remapping occurs transparently to whichever user/client is accessing the resource. Thus, network communications are not interrupted and all users access a resource through its backup server, while its primary server is out of operation. This process may be reversed when the primary server resumes operation, thereby regaining fault tolerant, i.e., backup capability.

No dedicated redundant resources are required to implement the current invention. Rather, the current invention allows server resident processes to intelligently reallocate servers to network resources in the event of server failure.

Figure 1:
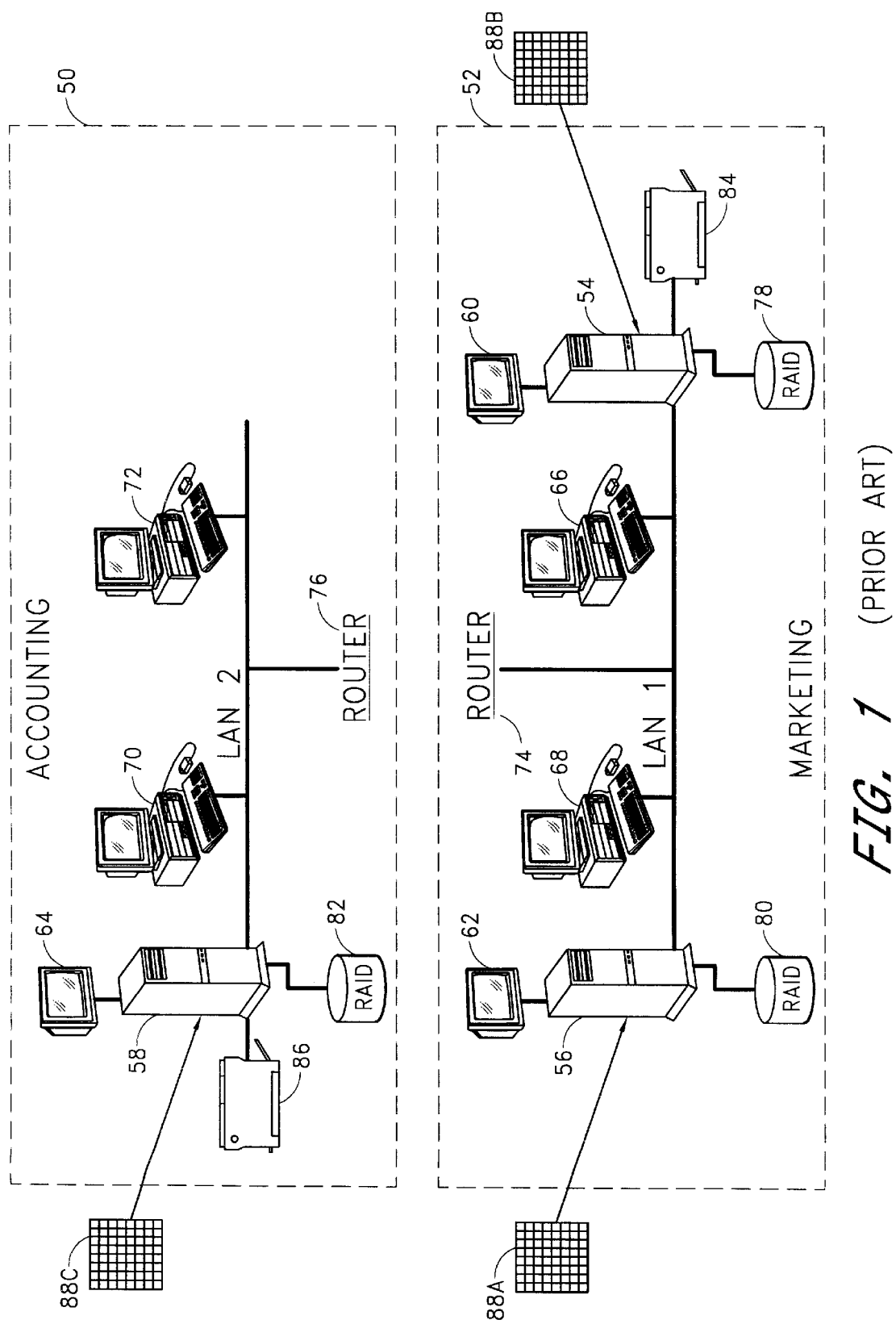
FIG. 1 is a hardware block diagram of a prior art network with replicated database for tracking network resources.

FIG. 1 is a hardware block diagram of a prior art enterprise network comprising LAN segments 50 and 52. LAN segment 50 comprises workstations 70–72, server 58, storage device 82, printer 86 and router 76. Server 58 includes display 64. LAN segment 52 includes workstations 66 and 68, servers 54 and 56, storage devices 78 and 80, printer 84 and router 74. Server 56 includes display 62. Server 54 includes display 60. All servers in the cluster, and substantially all operating components of each clustered server, are available to improve the cost/performance of the network.

LAN segment 50 includes a LAN connection labeled "LAN-2" between workstations 70 and 72, server 58 and router 76. Storage device 82 and printer 86 are connected to server 58 and are available locally as network resources to either of workstations 70 and 72. LAN segment 50 is connected by means of router 76 to LAN segment 52 via router 74. LAN segment 52 includes a LAN connection labeled LAN-1 between workstations 66 and 68, servers 54–56 and router 74. Storage device 78 and printer 84 are connected to server 54. Storage device 80 is connected to server 56. Either of workstations 66 and 68 can connect via server 54 locally to printer 84 and storage device 78. Either of workstations 66 and 68 can connect locally via server 56 to storage device 80.

Each of the servers 54, 56 and 58 includes respectively copies 88A, 88B, and 88C of the replicated network directory database. Such a replicated network directory database is part of the NetWare Directory Services (NDS), is provided in Novell's NetWare 4.x product. The format and functioning of this database, which is a foundation for the current invention is described in greater detail in FIG. 2.

Figure 2:
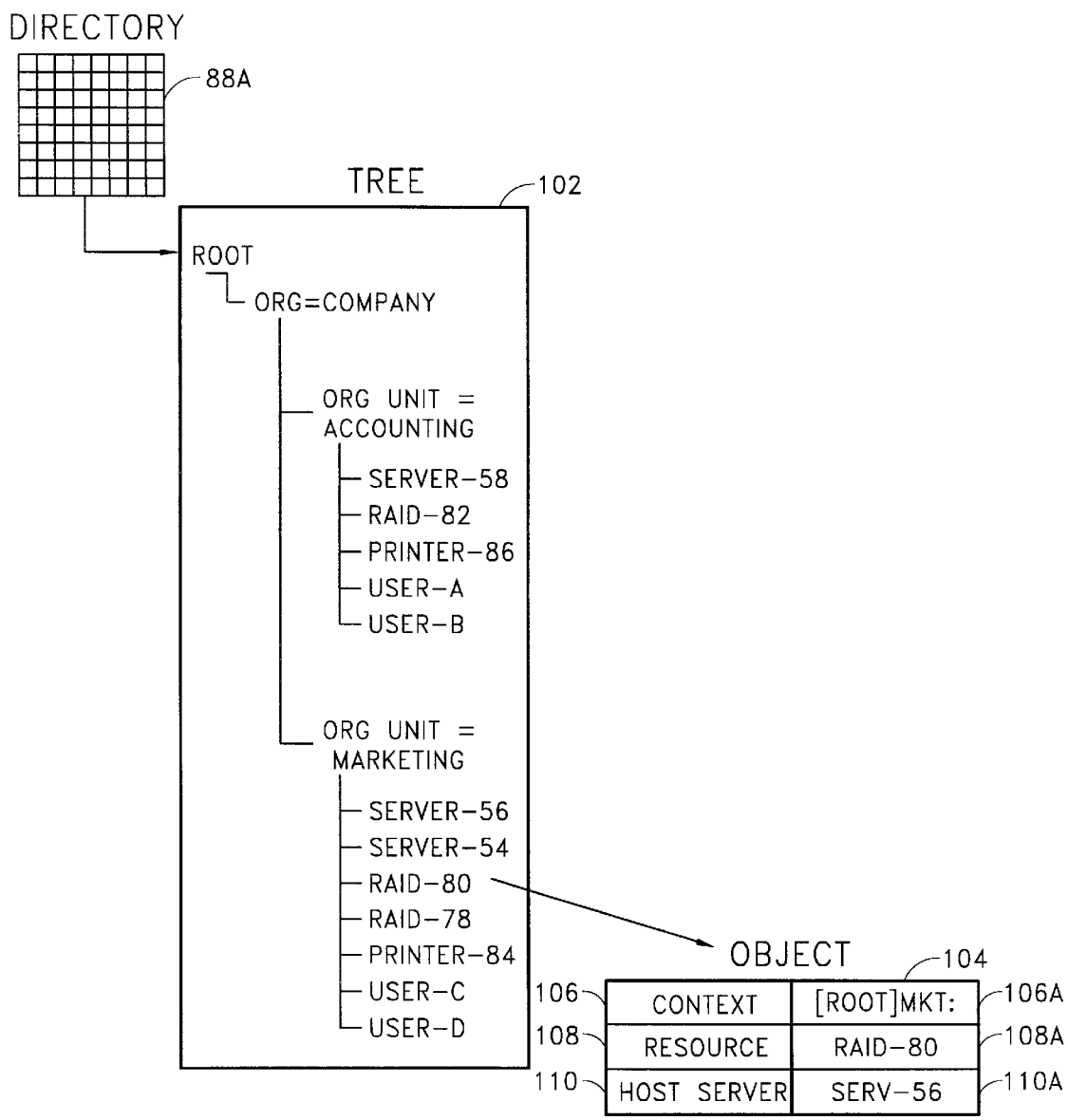
FIG. 2 is a functional block diagram of the replicated database used in the prior art network shown in FIG. 1.

FIG. 2 is a detailed block diagram of replica 88A of the prior art replicated NetWare® Directory Services (NDS) database, such as is part of NetWare® 4.x. The replicated network directory database includes a directory tree 102 and a series of node and leaf objects within the tree. Leaf object 104 is referenced. In NDS physical devices are represented by objects or logical representations of physical devices. Users are logical user accounts and are one type of NDS object. The purpose of object oriented design is to mask the complexity of the physical configuration of the network from users and administrators. A good example of a logical device is a file server. A file server is actually a logical device, such as a NetWare® server operating system running on a physical device, a computer. A file system, is the logical file system represented in the file server's memory and then saved on the physical hard drive. In NDS, a file server is a type of object and so is a NetWare® volume. Objects represent physical resources, users and user related entities such as groups. Object properties are different types of information associated with an object. Property values are simply names and descriptions associated with the object properties. For example, HP3 might be the property value for the printer name object property which is in turn associated with the printer object.

NDS uses a hierarchical tree structure to organize the various objects. Hence, the structure is referred to as the NDS tree. The tree is made up of these three types of objects: the root object, container objects and leaf objects. The location in which objects are placed in a tree is called a context or name context similar to a pointer inside a database. The context is of key importance; to access a resource the user object must be in the same context as the resource object. A user object has access to all objects that lie in the same directory and in child directories. The root object is the top of a given directory tree. Branches are made of contained objects. Within them are leaf objects. A crude analogy is the directory tree of your hard disk. There is a back slash or root at the base of the tree, each subdirectory can be prepared to a container object and files within the subdirectories can be compared to leaf objects in NDS. The root object is created automatically when you first install NDS. It cannot be renamed or deleted and there is only one root in a given NDS tree. Container objects provide a way to logically organize other objects in the NDS tree. A container object can house other container objects within it. The top container is called the parent object. Objects contained in a container object are said to be child objects. There are three types of parents or containers: organization, organizational unit and country. You must have at least one organization object within the NDS tree and it must be placed one level below root. The organization object is usually used to denote a company. Organizational units are optional. If you use them, they are placed one level below an organization object. Leaf objects include user, group, server, volume, printer, print queue and print server. Associated with each object is a set of object rights.

The directory tree is a distributed database that must make information available to user's connected to various parts of the network. Novell directory services introduces two new terms, partition and replica, to describe the mechanics of how the directory tree is stored. The directory tree is divided into partitions. A partition is a section of the database under an organization unit container object such as marketing. Novell directory services divides the network directory tree into partitions for several reasons. A replica is a copy of a directory tree partition. Having replicas of directory tree partitions on multiple servers has both good and bad points. Each replica must contain information that is synchronized with every corresponding replica. A change to one partition replica must be echoed to every other replica. The more replicas, the more time the network traffic is involved in keeping replicas synchronized.

The directory tree 102 in FIG. 2 comprises a root node, a company node, organizational nodes, and leaf nodes. The company node is directly beneath the root node. Beneath the company node are two organizational unit nodes labeled Accounting and Marketing. Beneath each organizational unit nodes are a series of leaf nodes representing those network resources associated with the Accounting unit and the Marketing unit. The organizational unit labeled Accounting has associated with it the following leaf nodes: server 58, storage device 82, printer 86, and users A and B [See FIG. 1]. The organizational unit labeled Marketing has associated with it, the following leaf nodes: server 56, server 54, storage device 80, storage device 78, printer 84, and users C and D [See FIG. 1].

Each object has specific object properties and property values. As defined by Novell in their NetWare® 4.x, a volume object has three object properties: context, resource name, and server affiliation. Context refers to the location in the directory tree of the object and is similar in concept to a path statement. For example, printer 86 is a resource available to the Accounting Department, and not to the Marketing Department. The next object property is resource name. The resource name is a unique enterprise wide identifier for the resource/object. The next object property is host server affiliation. Host server affiliation is an identifier of the server through which the object/resource may be accessed.

The object/resource record 104 for storage device 80 is shown in FIG. 2. The object/resource includes a context property 106, a resource name property 108, and host server affiliation property 110. The context property has a context property value 106A of: [Root]\Company\Marketing\. The resource name property value 108A is: RAID-80. The host server affiliation property value 110A is server 56. A network administrator may add or delete objects from the tree. The network administrator may alter object property values. As discussed above, any changes made in the directory of one server are propagated/replicated across all servers in the enterprise.

Enhanced Directory+Server Processes

Figure 3:
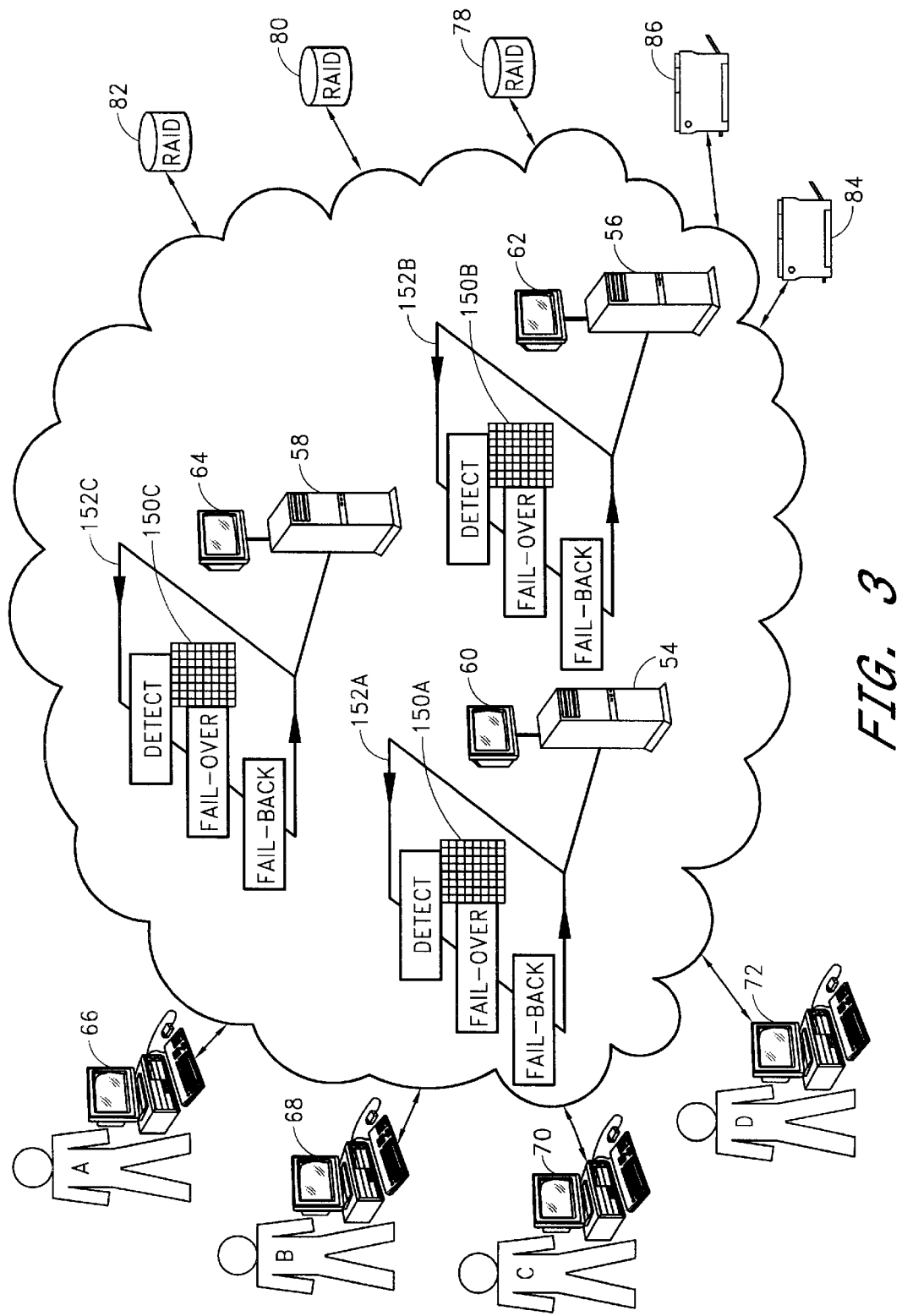
FIG. 3 is a hardware block diagram showing a network with server resident processes for providing fault tolerant network resource recovery in accordance with the current invention.

FIG. 3 is a hardware block diagram of an embodiment of the current invention in a local area network. Users A–D are shown interfacing via workstations 66–72 with network resources. The network resources include servers 54–58, storage devices 78–82 and printers 84–86, for example. The relationship between network resources is defined not only as discussed above in connection with FIGS. 1–2 for normal operation, but also for operation in the event of a failure of any one of the network resources. This additional utility, i.e., fault tolerance is a result of enhancements to the network directory databases 150A–C and processes 152A–C resident on each server. The server resident processes operating in conjunction with the enhanced network directory database allow failure detection, resource/object remapping and recovery. Thus, network downtime is reduced by transparently remapping network resources in response to a detection of a failure. The remapped route is defined within the enhanced directory. The routes that are defined in the directory may be part of the initial administrative setup; or may be a result of an automatic detection process; or may be a result of real time arbitration between servers. The server resident processes 152A–C have the additional capability of returning the resource/network to its initial configuration when the failed resource has been returned to operation. This latter capability is also a result of the interaction between the host resident processes 152A–C and the enhanced network directory 150A–C.

Figure 4:
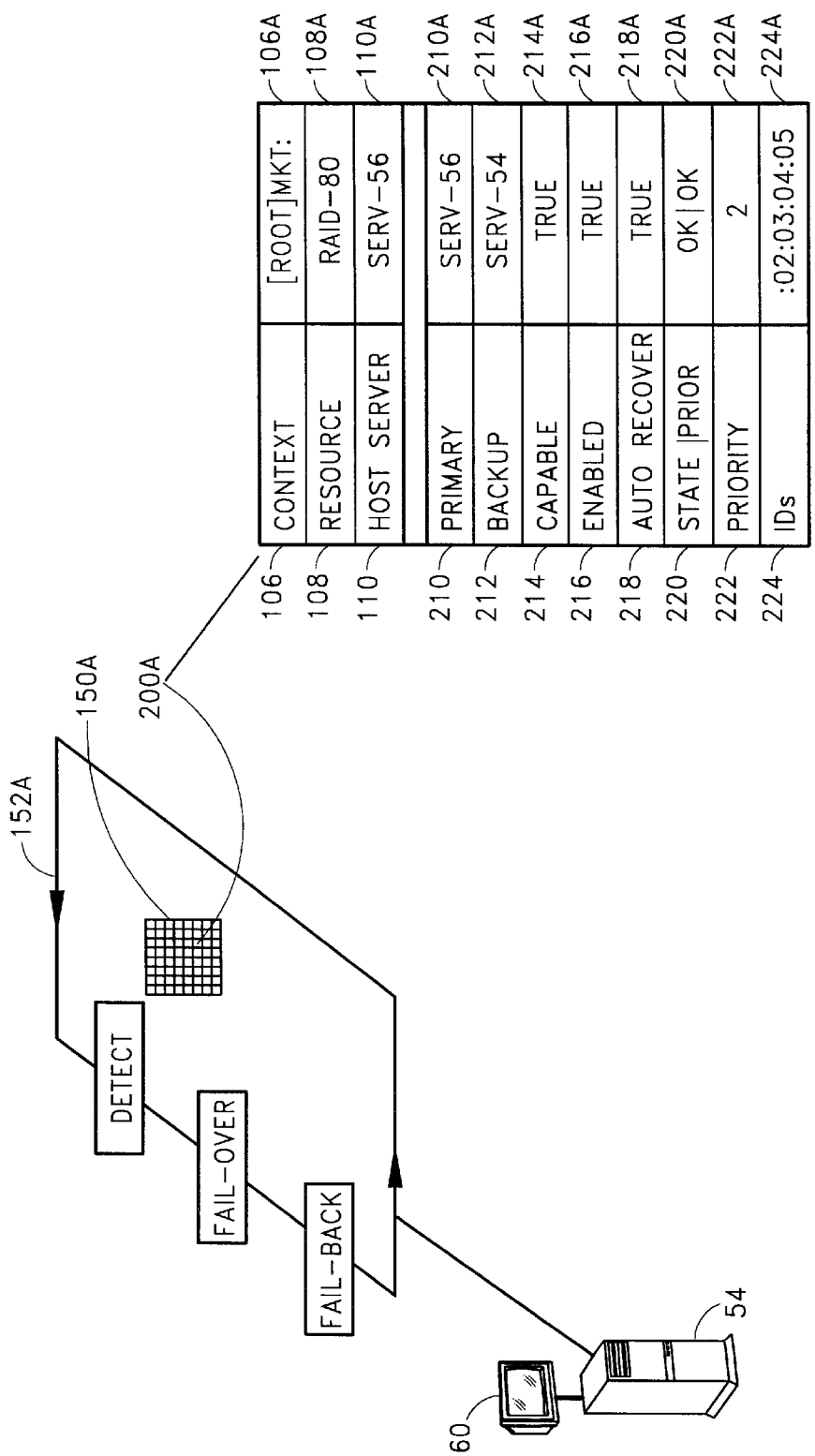
FIG. 4 is a detailed block diagram of an enhanced network resource object definition which operates in conjunction with the server resident processes of FIG. 3.

FIG. 4 is a detailed block diagram of the enhanced object/resource properties provided within the enhanced network directory database. Object 200A within enhanced network directory database 150A is shown. Object 200A contains object properties and property values for the storage device RAID 80 shown in FIG. 3. In addition to the three prior art object properties, i.e., context property 106, resource name property 108 and host server affiliation property 110, additional properties are defined for the object in the enhanced network directory database. Property 210 is the primary server affiliation for the resource, i.e., RAID-80. The property value 210A for the primary server affiliation is server 56. Thus, server 56 will normally handle network communications directed to RAID-80. Property 212 is the backup server affiliation for the resource. The property value 212A for the backup server affiliation is server 54. Thus server 54 will handle network communications with RAID-80 in the event of a failure of server 56. Cluster property 214 indicates whether the resource is cluster capable, i.e., can be backed up. The values for this property are boolean True or False value. The cluster property value in FIG. 4 is boolean True which indicates that RAID 80 has physical connections to more than one server, i.e., servers 54–56. Enable property 216 indicates whether a cluster capable object will be cluster enable, i.e., will be given a backup affiliation. The property values associated with this property are boolean True or False. The enable property value 216A of boolean TRUE indicates that RAID 80 is cluster capable and that clustering/backup capability has been enabled. The optional auto-recover property 218 indicates whether the cluster enabled object is to be subject to automatic fail back and/or auto recovery. The auto recover property has the property values of boolean True or False. The auto-recover property value 218A is TRUE which indicates that RAID 80 will fail back without user confirmation to server 56 when server 56 recovers. Prior state property 220 indicates the prior state of the resource. The property values associated with this are: OK, fail over in progress, fail over complete, fail back in process, fail back complete. The prior state property value 220A of OK indicates that this resource RAID 80 has not failed. The priority property value 222 indicates the priority for fail over. The priority property may have values of 1, 2 or 3. This property may be utilized to stage the fail over of multiple resources where the sequencing of recovery is critical. The priority property value 222A of "2" indicates that RAID 80 will have an intermediate staging in a recovery sequence. The hardware ID property value 224 is the unique serial identifier associated with each hardware resource. The hardware ID property value 224A of :02:03:04:05 indicates that RAID 80 is comprised of four volumes, each with their own unique serial number identifier. Any object in the enhanced network directory database may be cluster/backed-up. Therefore the methods of certain embodiments of the current invention are equally applicable to printers, print queues, and databases as to storage devices.

Figure 5A:
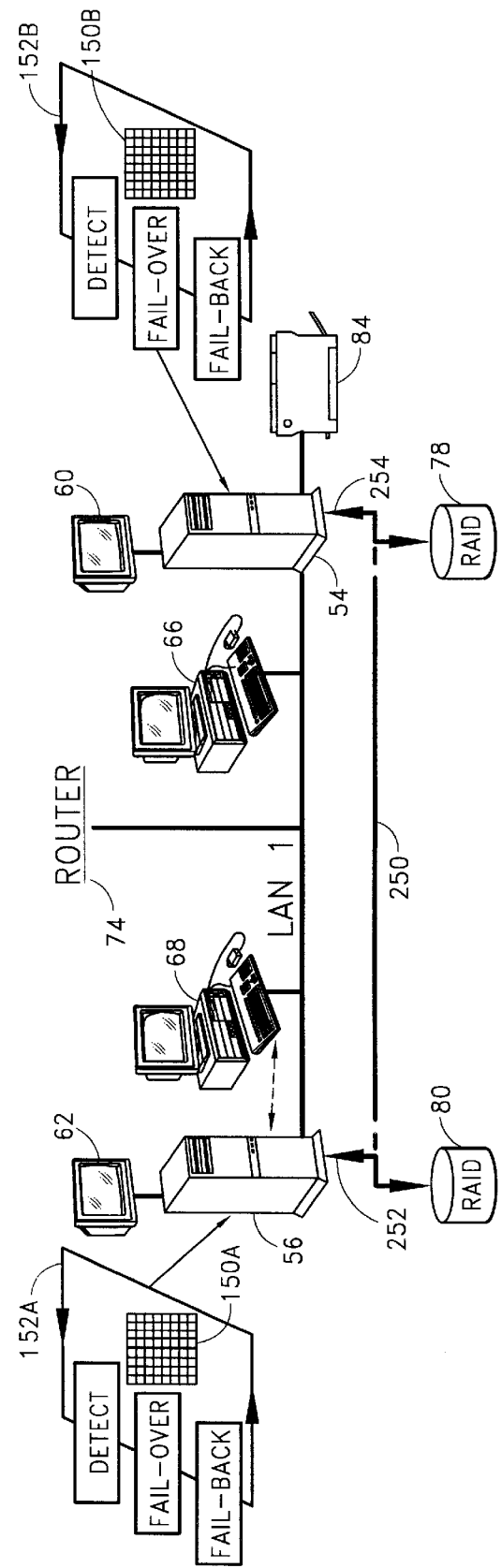
FIGS. 5A–E are hardware block diagrams showing detection, fail-over and fail-back stages of the current invention for a storage device connected to a primary and backup server.

FIGS. 5A–E show a sequence of detection, fail-over and fail-back for storage device 80. Storage device 80 may be affiliated physically with either one of two servers. FIG. 5A includes workstations 66–68, servers 54–56, storage devices 78–80, printer 84 and router 74. Server 54 includes a display 60. Server 56 includes a display 62. Workstations 66 and 68 are connected via LAN-1 to router 74 and servers 54 and 56. Server 56 is directly connected to storage device 80. Server 54 is directly connected to printer 84 and storage device 78. A connection 250 also exists between servers 54–56 and storage devices 78–80. Servers 54–56 each contain replicas respectively, 150B–A of the enhanced network directory database. Server 54 runs process 152B for detection, fail-over and fail-back. Server 56 runs process 152A for detection, fail-over and fail-back. In FIG. 5A, server 56 has a primary relationship with respect to storage device 80. This relationship is determined by the object properties for storage device 80 in the replicated network directory database [see FIG. 4]. Communication 252 flows between RAID 80 and server 56. In the example shown, workstation 68 is communicating via server 56 with storage device 80. Server 54 has a primary relationship with storage device 78 as indicated by communication marker 254. This relationship is determined by the object properties for storage device 78 in the replicated network directory database.

Figure 5B:
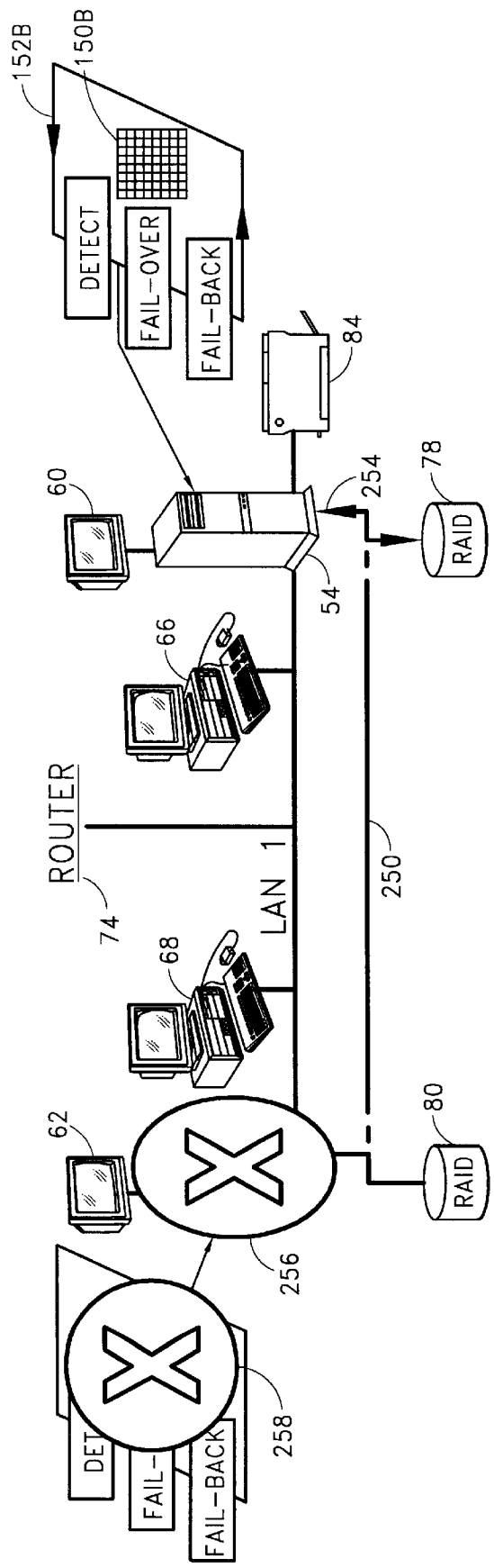

FIG. 5B shows an instance in which server 56 and the process resident thereon has failed, as indicated by the termination marks 256 and 258. Communications via server 56 between workstation 68 and storage device 80 are terminated.

Figure 5C:
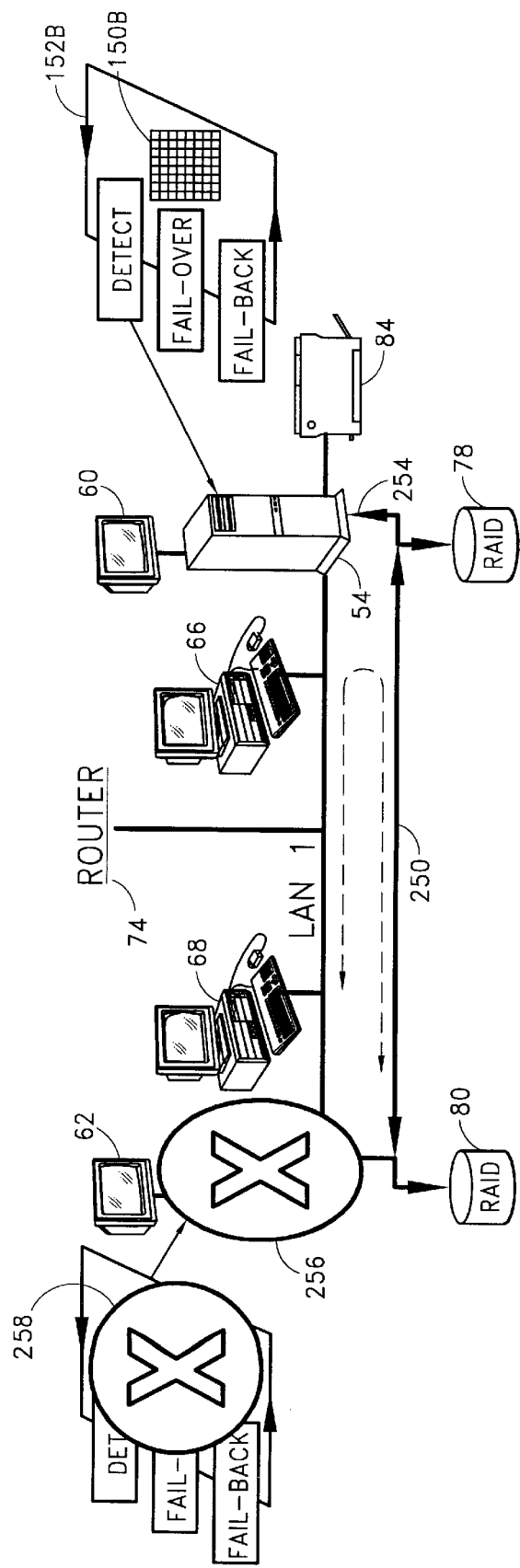

As shown in FIG. 5C, process 152B running on server 54 has detected the failure of server 56 and has remapped communications between workstation 68 and storage device 80 via server 54. This remapping is the result of the process 152B running on server 54. These processes have detected the failure of server 56. They have determined on the basis of backup property values for storage device 80 stored in the enhanced network directory database 150B that server 54 can provide backup capability for storage device 80. Finally, they have altered the property values on the object/record for storage device 80 within the enhanced network directory database to cause communications with the storage device 80 to be re-routed through server 54.

Figure 5D:
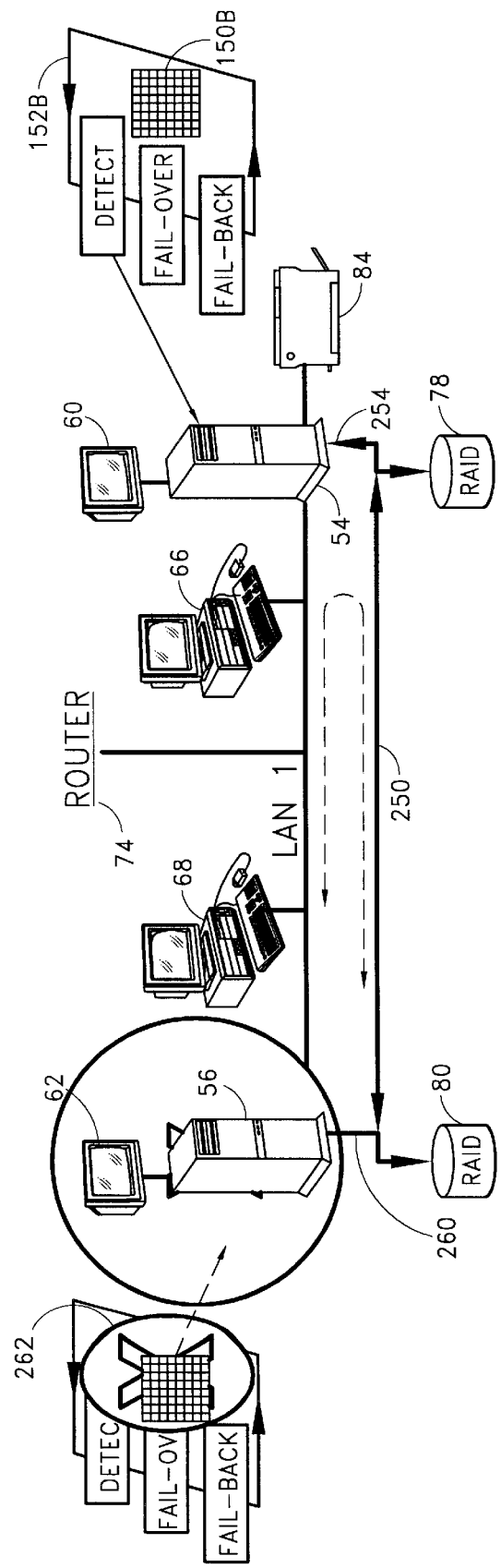

FIG. 5D indicates that server 56 has resumed normal operation. Server 56's replica 262 of the enhanced network directory database is stale or out of synchronization with the current replica 150B contained in server 54. The replica 262 is updated to reflect the changes in the server-to-storage device configuration brought about by the processes running on server 54. Communications between workstation 68 and storage device 80 continue to be routed via server 54, as indicated by communication marker 260, because that server is listed on all replicas of the enhanced network directory database as the host server for resource/object identified as storage device 80.

Figure 5E:
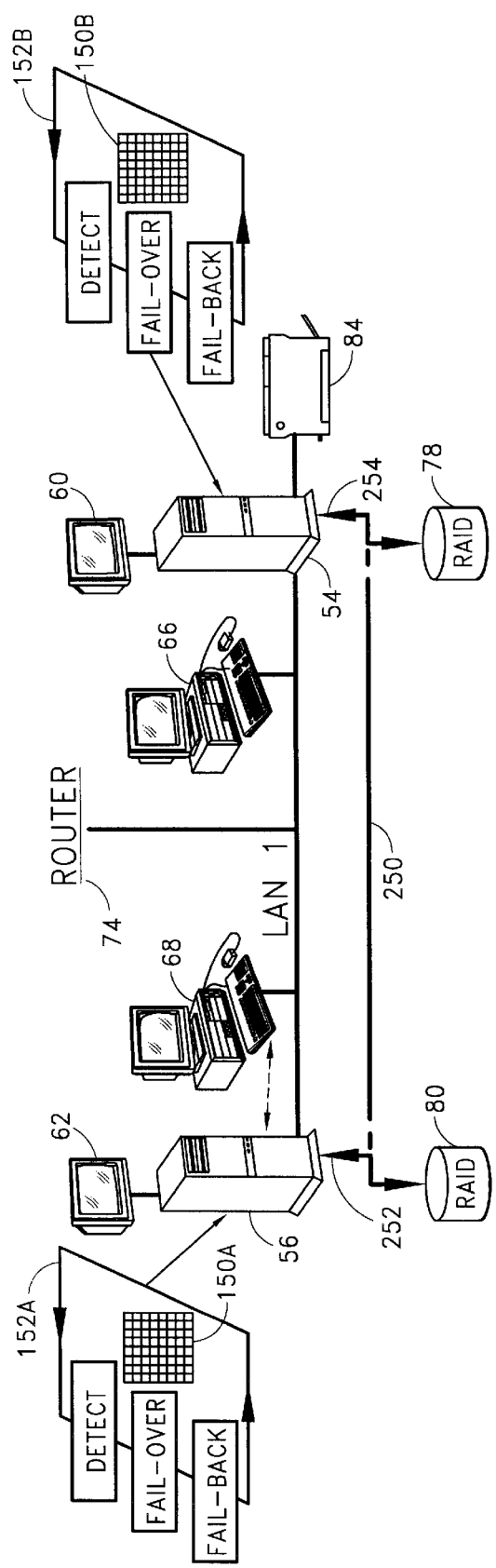

In FIG. 5E updated replicas 150A–B of the network directory database are present on respectively servers 56–54. Processes 152A–B running on respectively servers 56–54 have caused the network to be reconfigured to its original architecture in which server 56 is the means by which workstation 68, for example, communicates with storage device 80. This fail-back is a result of several acts performed cooperatively by processes 152A–B. Process 152B detects re-enablement of server 56. Process 152B relinquishes ownership of storage device 80 by server 54. Process 152A running on server 56, detects relinquishment of ownership of storage device 80 by server 54 and in response thereto updates the host server property value for resource/object storage device 80 in the replicated network directory database. Communications between workstation 68 and storage device 80 are re-established via server 56, as indicated by communication marker 252. All of these processes may take place transparently to the user, so as not to interrupt network service. During the period of fail-over, server 54 handles communications to both storage device 78 as well as storage device 80.

FIGS. 6A–6E shows the object properties and property values for storage device 80, during the events shown at a hardware level in FIGS. 5A–E. These object properties and property values are contained in replicas 150A–B of the enhanced network directory database and specifically stored in servers 56–54. In FIGS. 6A–E, the object property values for storage device 80 are shown. On the left-hand side of each figure the object/record that is stored in server 56 is shown. On the right-hand side of each figure the object/record that is stored in server 54 is shown. The enhanced directory replicated on each server contains multiple objects representing all network resources. The enhanced directory on server 56 is shown to contain an additional object 202A and the enhanced directory in server 54 is shown to contain an additional object 202B, representative of the many objects within each enhanced directory database.

Figure 6A:
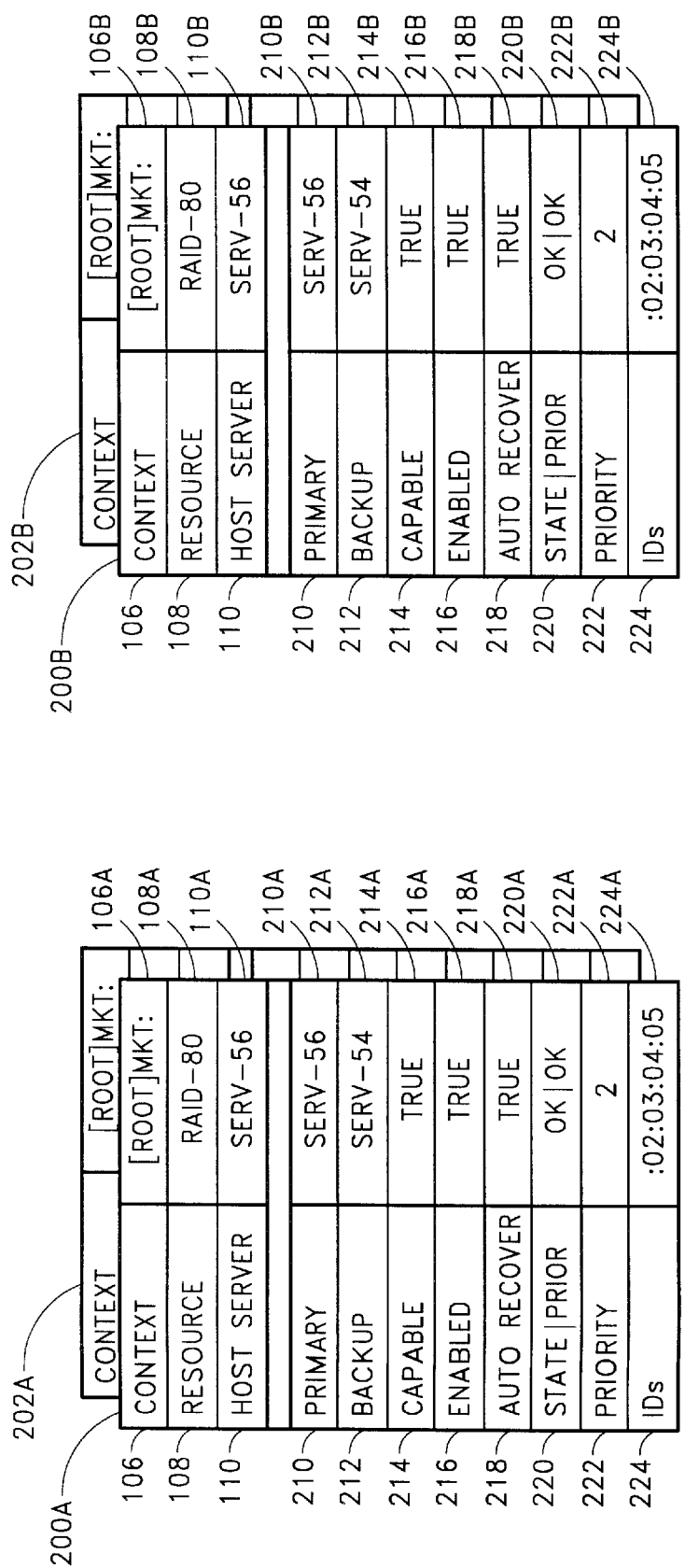
FIGS. 6A–E show the object record for the storage device of FIG. 5 on both the primary and secondary server during the stages of detection, fail-over and fail-back.
Figure 6B:
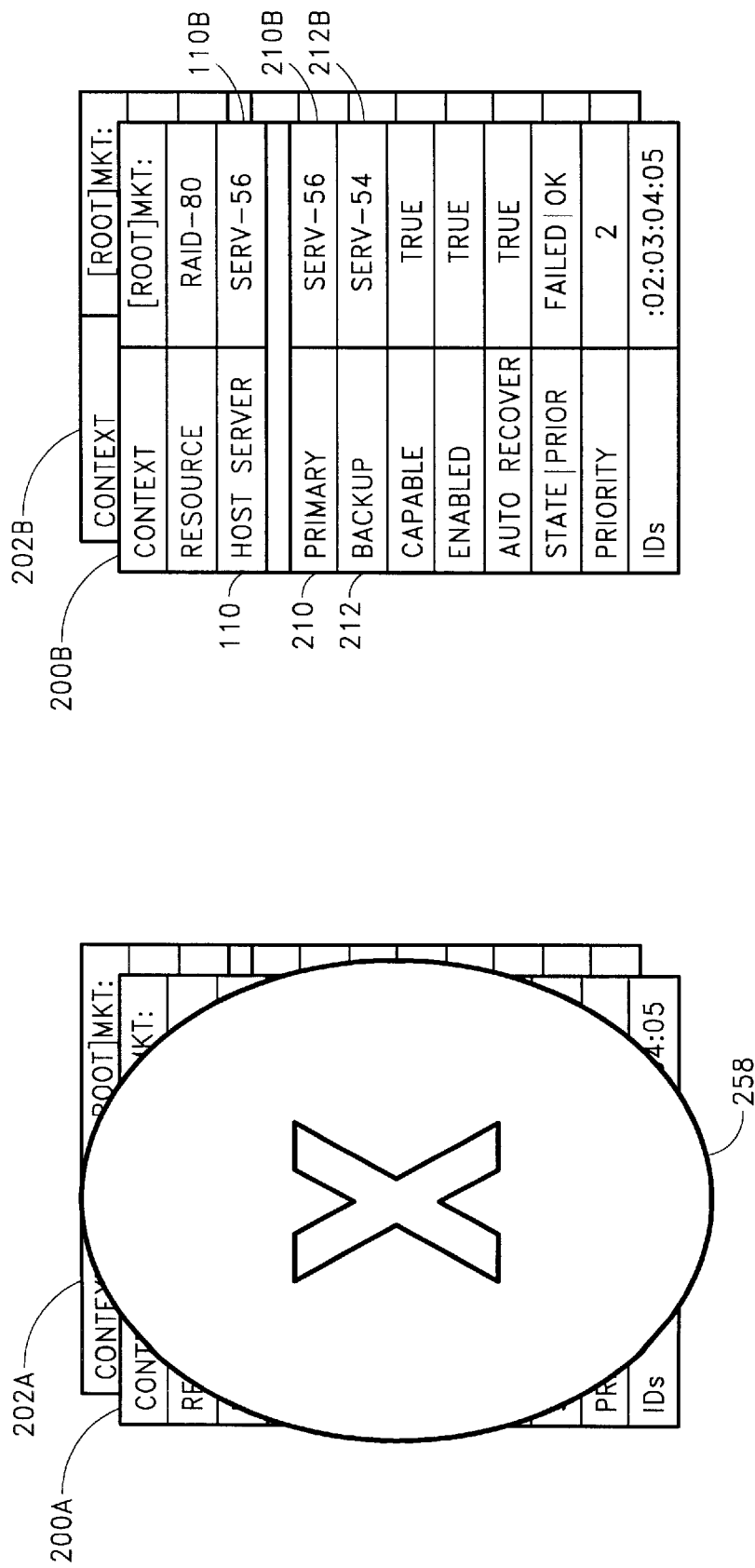
Figure 6C:
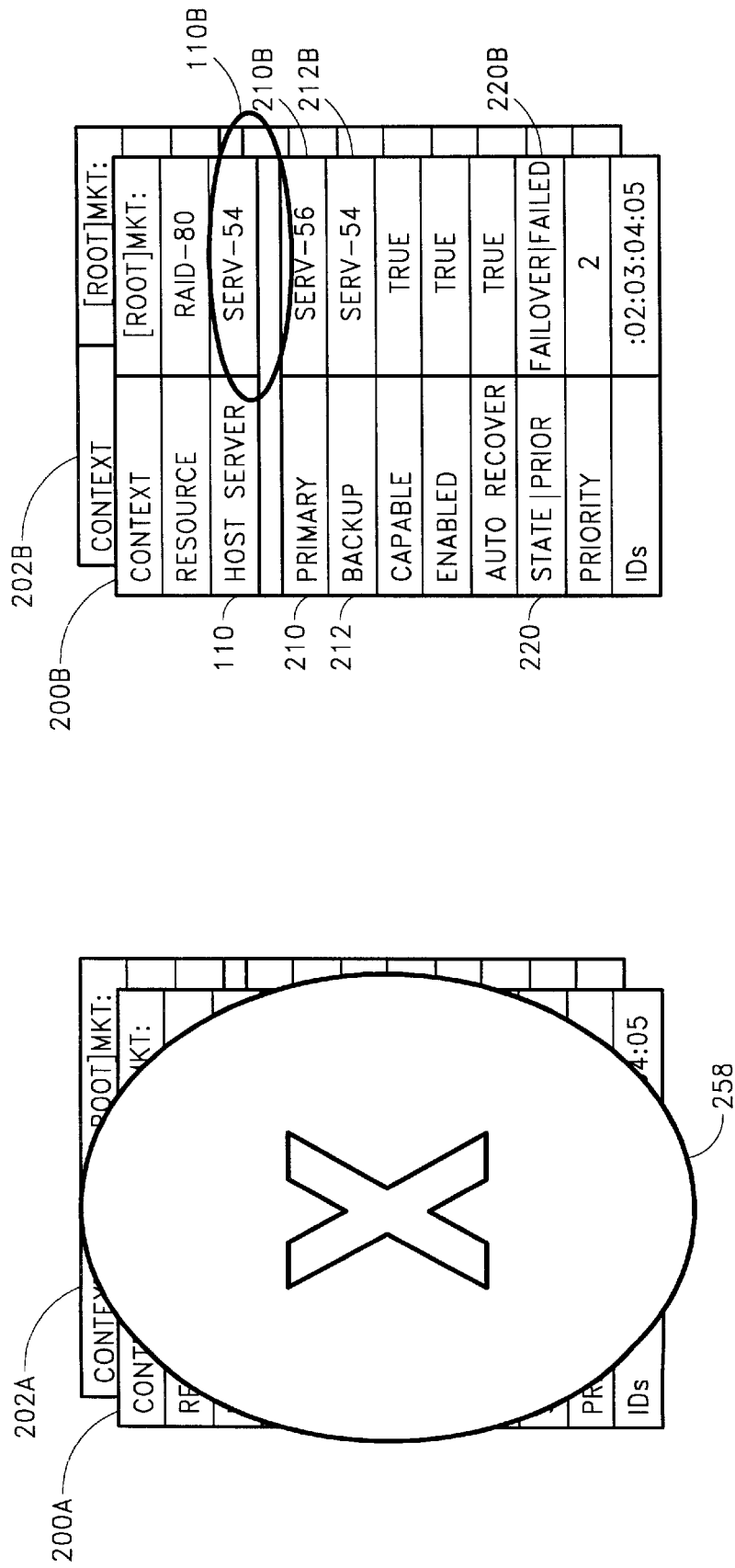

FIG. 6A shows an initial condition in which the host server property variable 110A/B and the primary server property value 210A/B match. In FIG. 6B, server 54 has failed and therefore the replica of the enhanced network directory database and each of the objects within that directory are no longer available as indicated by failure mark 258. Nevertheless, an up-to-date current replica of the enhanced network directory database is still available on server 56 as indicated by objects 200B and 202B on the right-hand side of FIG. 6B. In FIG. 6C, the fail-over corresponding to that discussed above in connection with FIG. 5C is shown. The host server property value 110B has been updated to reflect current network routing during the failure of server 56. The host server property value 110B is server 54. Because the resource/object for storage device 80 appears on all servers as server 54, all communications between workstations, i.e., workstation 68 are re-routed through server 54 to storage device 80. The fail-over is accomplished by resident process 152B on server 54 [see FIGS. 5A–E]. These processes detect the failure of server 56. Then they determine which server is listed in the resource/object record for storage device 80 as a backup. Next the processes write the backup property value to the host property value for storage device 80. Replicas of this updated set of property value(s) for object 200B, corresponding to the storage device 80, are then replicated throughout the network. As indicated in FIG. 6C, the prior state property value 220B is updated by the resident process 152B [see FIGS. 5A–E] to indicate that a fail-over has taken place.

Figure 6D:
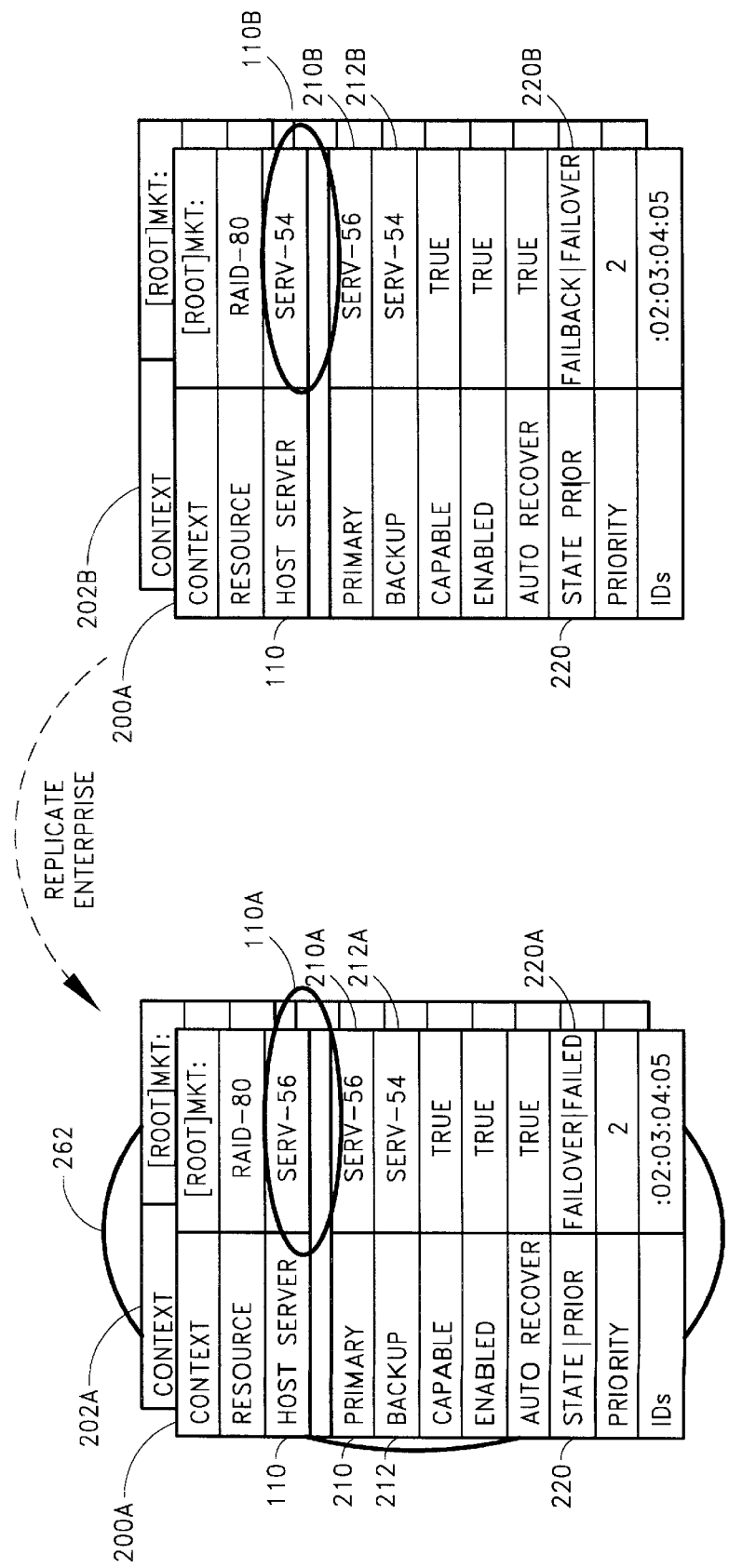

As indicated in FIG. 6D, when server 54 first comes back on line it contains a stale, i.e., out of date copy of the property values for all objects including object 200A corresponding to storage device 80. The existing functionality of NetWare® 4.x causes this stale enhanced directory to be refreshed with a current property values generated, in this instance, by the resident process 152B on server 54. [see FIGS. 5A–E]

Figure 6E:
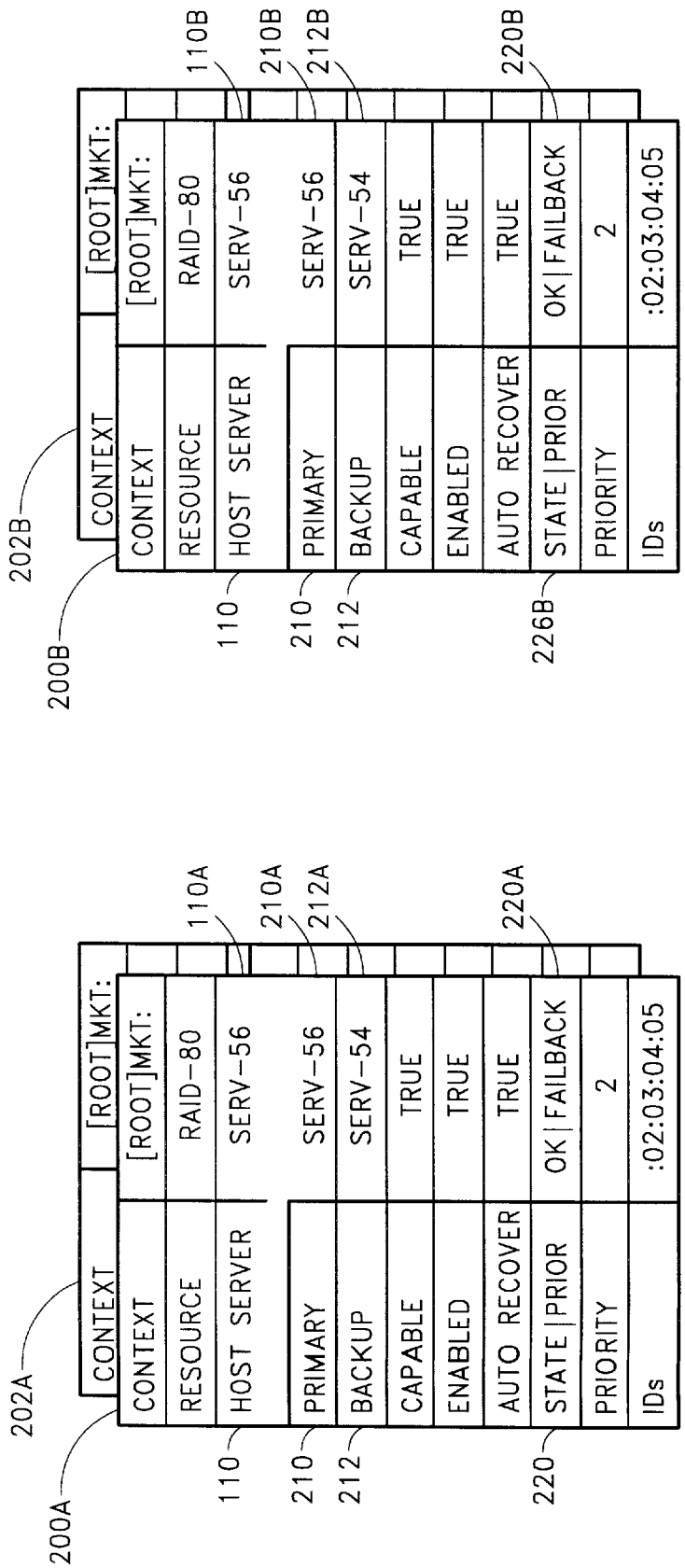

FIG. 6E indicates the completion of a fail-back. The resident process 152B [see FIGS. 5A–E] on server 54 detects resumption of operation by server 56. These processes then relinquish ownership of storage device 80. Then the resident process 152B [see FIGS. 5A–E] on server 54 asserts ownership of storage device 80 and rewrite the host server property value 110B for storage device 80 to correspond to the primary server property value 210A, which is server 56. This updated record/object is again replicated in all the replicated network directory databases throughout all the servers on the network. Thus, all communications between workstations, i.e., workstation 68 and storage device 80 are routed through server 56. [see FIGS. 5A–E] The prior state property values 220A–B are set to fail-back indicating that the prior state for the object is fail-back.

Figure 7:
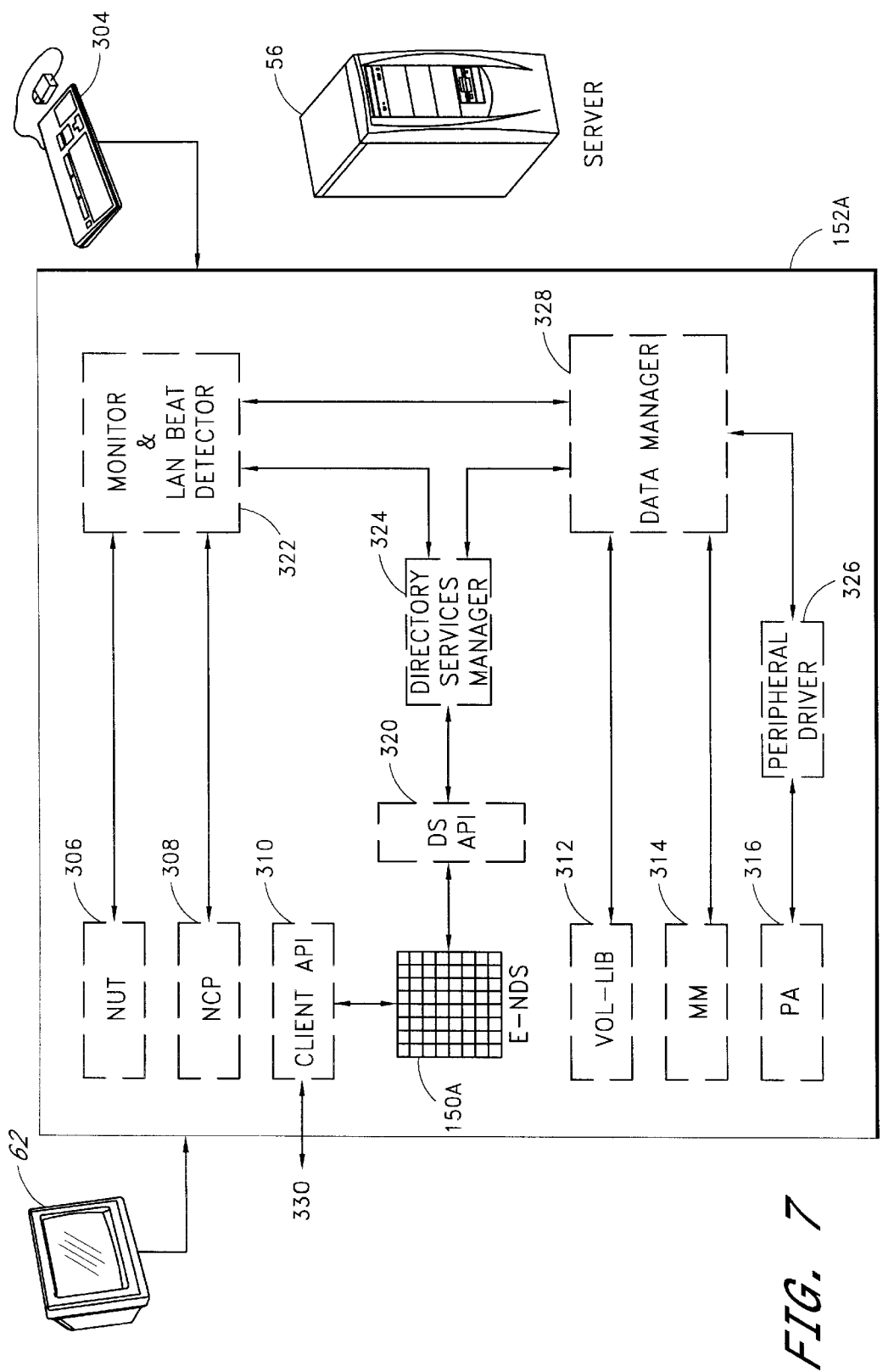
FIG. 7 is a functional block diagram showing the processing modules of the current invention on a server.

FIG. 7 is a block diagram of the modules resident on each server 56 which collectively accomplish the process 152A associated with detection, fail-over and fail-back. Similar modules exist on each server. A server input unit 304 and display 62 are shown. Modules 306–316 are currently provided with network utilities such as NetWare® 4.x. These modules may interact with modules 320–328 in order to provide the resident process 152A for detection, fail-over and fail-back. Module 306 may be a NetWare Loadable Module (NLM) which provides a graphical interface by which a user can interact with NetWare® 4.x and also with the resident process 152A. Module 308 may be a communication module which provides connection oriented service between servers. A connection oriented service is one that utilizes an acknowledgment packet for each package sent. Module 310 may include client base applications which allow a user at a workstation to communicate 330 directly with both the network software, as well as with the resident process 152A. Module 150A is a replica of the enhanced network directory database which includes the additional object properties discussed above in FIGS. 3–4. Module 312, identified as Vol-Lib, is a loadable module which provides volume management services including scanning for volumes, mounting volumes and dismounting volumes. Module 314 is a media manager module which allows a server to obtain identification numbers for all resources which are directly attached to the server. Module 316 is a peripheral attachment module which allows the server to communicate with devices such as storage devices or printers which may be direct attached to it. Module 320 provides an application programming interface (API) which allows additional properties to be added to each object in the enhanced network directory database. This module also allows the property values for those additional properties to be viewed, altered, or updated.

Modules 322–328 may interact with the above discussed modules to provide the server resident processes for detection, fail-over and fail-back. Module 322 may handle communications with a user through network user terminal module 306. Module 322 may also be responsible for sending and receiving packets through NCP module 308 to manage failure detection and recovery detection of a primary server. Module 324, the directory services manager, may be responsible for communicating through module 320 with the enhanced network directory database 150A. Module 324 controls the addition of properties as well as the viewing, and editing of property values within that database. Module 326 is a device driver which in a current embodiment superimposes a phase shifted signal on the peripheral communications between a server and its direct connected resources to detect server failure. Module 326 sends and receives these phase shifted signals through module 316. Module 328 controls the overall interaction of modules 322–326. In addition, module 328 interfaces with module 312 to scan, mount and dismount objects/resources. Furthermore, module 328 interacts with module 314 to obtain device hardware identifiers for those devices which are direct attached to the server. The interaction of each of these modules to provide for detection, fail-over and fail-back will be discussed in detail in the following FIGS. 8A–C.

Figure 8A:
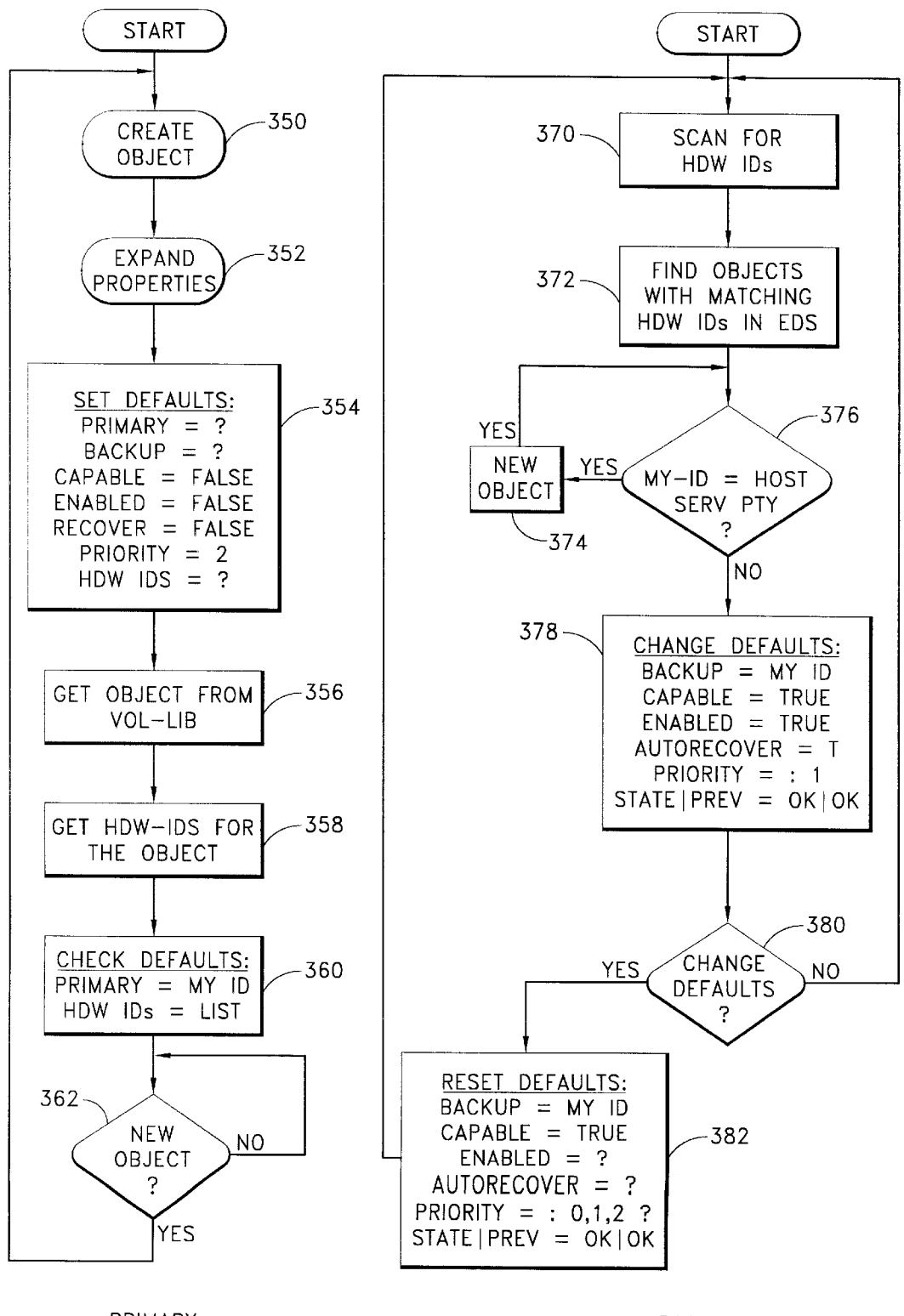
Figure 8C:
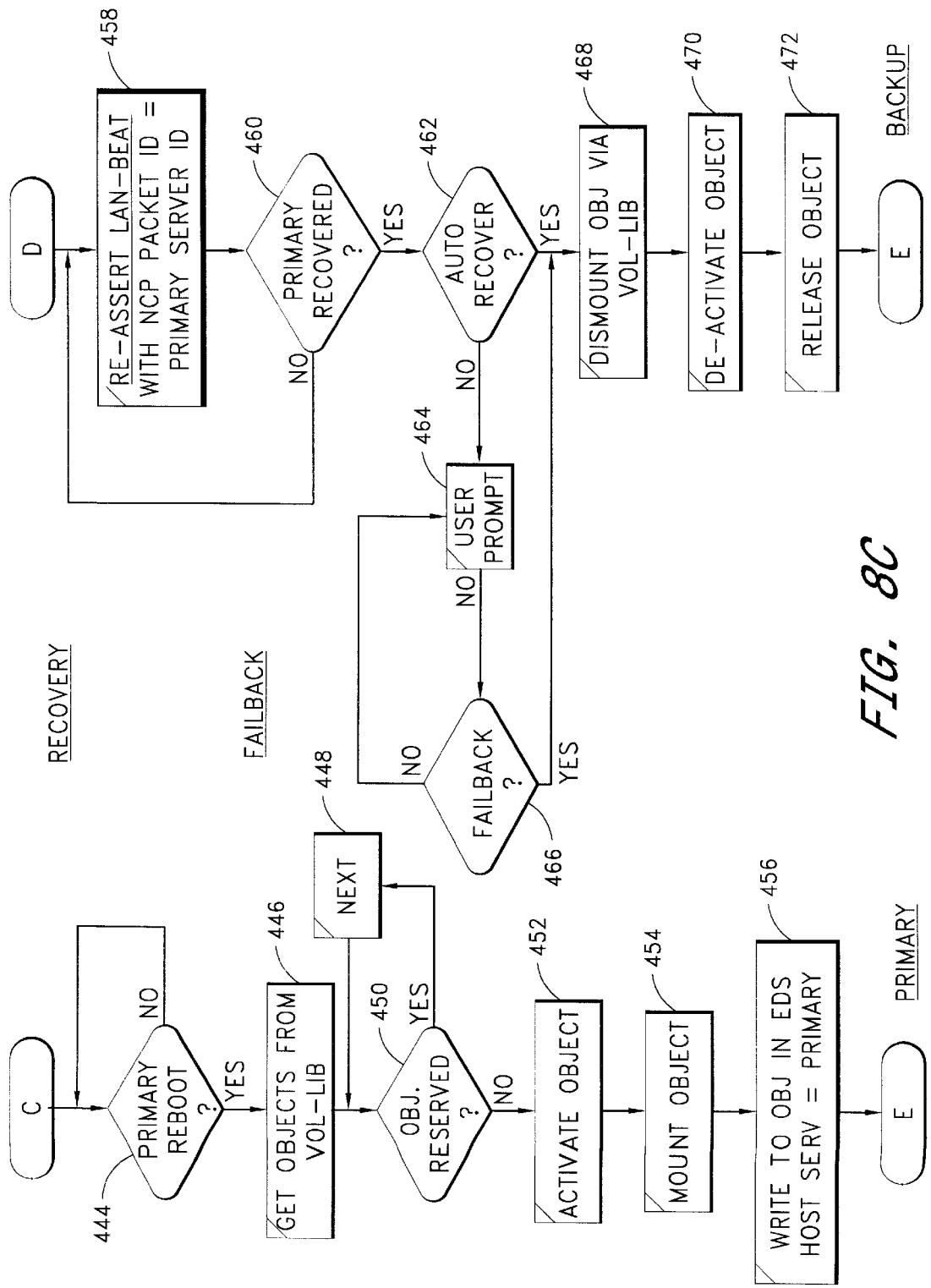

FIGS. 8A–C show an embodiment of the processes for detection, fail-over and fail-back which are resident on all servers. FIG. 8A identifies the initial processes on both primary and backup servers for creating and authenticating objects. The authentication of an object/resource involves determining its cluster capability, and its primary and backup server affiliation. FIG. 8B indicates processes corresponding to the failure detection and fail-over portion of the processes. FIG. 8C corresponds to those processes associated with recovery and fail-back. FIGS. 8A–C each have a left-hand and a right-hand branch identified as primary and backup branch. Since each server performs as a primary with respect to one object and a secondary with respect to another object, it is a characteristic of the resident processes that they will run alternately in a primary and a backup mode depending on the particular object being processed. For example, when an object being processed has a primary relationship with respect to the server running the processes, then the processes in FIGS. 8A–C identified as primary will be conducted. Alternately, when an object being processed has a secondary relationship with respect to the server running the processes, then the processes in FIGS. 8A–C identified as backup will be conducted. An object which has neither a primary nor backup relationship with the server running the process will not be subject to detection, fail-over or fail-back processing.

FIG. 8A sets forth an embodiment of the authentication process. During authentication, specific primary and secondary server relationships are established for a specific network object. And those relationships are written into the property values associated with that object in the enhanced network directory database. The process begins at process 350 in which a new object is created and property values for context, resource name and server affiliation are defined for that object. Control is then passed to process 352 in which the additional properties discussed above in connection with FIG. 4 are added to that object's definition. Then in process 354 default values for a portion of the new expanded properties are added.

There are several means by which default values can be obtained. In an embodiment default values are completely defined by a network administrator for all expanded properties at the time of object creation. In another embodiment, the one shown in FIG. 8A, only minimal default values are initially defined and the server resident processes on the primary and secondary server define the rest. In either event, the newly created object is added to the expanded network directory and replicated throughout the network.

In FIG. 8A only the capable, enabled, auto-recover and priority properties are defined. Capable, enabled and auto-recover are all set to boolean False and priority is set to a value of "2". The partial definition of property values is feasible only because the hardware environment corresponds to that shown in FIGS. 5A–E and allows for an auto discovery process by which the property values can be automatically filled in by the primary and secondary server resident processes. These processes will now be explained in greater detail. Control then passes to process 356. In process 356, the data manager module acting through the vol-lib module [see FIG. 7] obtains the newly created object. Control is then passed to process 358. In process 358, the data manager module acting through the media module [see FIG. 7] determines the hardware IDs for all the devices direct connected to the server. Control is then passed to process 360. In process 360 the values for primary server property 210 and the hardware IDs 224 [see FIG. 4] in the expanded fields for the newly created object are filled in. The value for the primary server property 210 is equal to the ID of the server running the process. The value for the hardware ID property 224 is set equal to those hardware IDs obtained in process 358 which correspond to the hardware IDs of the object. Control is then passed to decision process 362. In process 362 a determination is made as to whether the user desires to create a new object. In the event that determination is in the affirmative control returns to process 350.

Each server also runs backup authentication processes which are shown on the right side of FIG. 8A. These processes commence at process 370. In process 370 the data manager through the media manager [see FIG. 7] scans locally for all devices which are directed attached to the server. This local scan produces hardware IDs for those objects to which the server is direct attached. Control is then passed to process 372. In process 372 the data manager through Vol Libs [see FIG. 7] obtains globally via the enhanced NDS database a list of all objects with hardware IDs which match those retrieved in process 370. Those objects which have hardware IDs matching those produced in the local scan conducted in process 370 are passed to decision process 376. In decision process 376 a determination is made as to which among those objects have a host server property field with a server ID corresponding to the ID of the server running these backup processes. In the event that determination is in the affirmative control is passed to process 374 in which the next object in the batch passed from process 372 is selected. Control then returns to decision process 376. In decision process 376 objects in which the host server property ID does not match the ID of the server running the process are passed to process 378. In process 378 the server running the process has identified itself as one which can serve as a backup for the object being processed. Thus, the ID of the server running the process is placed in the backup server field 212B [see FIG. 4]. Additionally the objects cluster capable and cluster enabled fields 214B–216B are set to a boolean True condition. The autorecover field 218B is set to boolean True as well. The priority, state and previous state fields 222B and 220B are also filled in with default values. Control is then passed to decision process 380. In decision process 380 a determination is made as to whether the user with administrative privileges wishes to change the default values. In the event that determination is in the negative controller returns to process 370. Alternately, if a determination is in the affirmative is reached then control is passed to process 382. In process 382 an administrator may disable the cluster enabled, autorecover and priority fields 216B, 218B and 222B. Control then returns also to process 370.

FIG. 8B shows the failure detection and fail-back portions of both the primary and backup processes. The processes for a server performing as a primary with respect to an object commence with splice block A. From splice block A control passes to process 398. In process 398 a drive pulse protocol is initiated. The drive pulse protocol is appropriate for those objects which are connected to the server by a bus, a Small Computer Storage Interconnect (SCSI) bus with multiple initiators, or any other means of connection. For example, in FIGS. 5A–5E, connection 250 connects both servers 54 and 56 to storage device 80. The drive pulse protocol across connection 250 enables the secondary server to sense primary server failure, as will be discussed shortly in connection with processes 402–408. The drive pulse protocol works by the current host, by some prearranged schedule, continuously issuing SCSI "release" and "reserve" commands, to allow the backup to detect the failure of the primary. The backup detects these commands being issued by the primary by continuously sending a "test unit ready". Control is then passed to process 400. Process 400 indicates that the primary continues to perform its portion of the drive pulse protocol until there is a failure of the primary in which case control passes to splice block C.

The processes run on the backup server in connection with failure-detection and fail-over are initiated at splice block B, which is shown on the right-hand side of FIG. 8B. Control passes from splice block B to processes 402–404. In process 402 the backup server continually monitors the LAN communication between itself and the primary server to determine when the primary server has failed. It does this by determining the primary server ID from the host server property value 110A [FIG. 4]. This object property ID is appended by the LAN detector module 322 to network control protocol packets. These packets are sent intermittently by the network control protocol module 308 [see FIG. 7] on the backup server to the primary server to determine when the primary server fails. Control is then passed to decision process 406. In decision process 406 the backup server monitors across connection 250 [see FIGS. 5A–E] the drive pulse discussed above in connection with process 400. These pulses can be used to determine when the connection from the primary server to the storage device has failed. Control then passes to decision process 406.

In decision process 406, a determination is made as to whether on the basis of LAN communications, the primary server has failed. In the event this determination is in the negative, control returns to processes 402 and 404. Alternately, if this determination is in the affirmative i.e., that the primary server is no longer responding to the secondary server's NCP packets, then control is passed to decision process 408. In decision process 408, a determination is made as to whether the drive pulse from the primary is still being received by the secondary server across connection 250. If a determination is made that the communication between the primary server and the storage device 80 has not failed, i.e., that the drive monitor is still detecting drive pulses from the primary, then control returns to processes 402 and 404. This secondary drive detection assures that a momentary LAN failure will not result in the determination that the primary server has failed when in fact that primary server still is communicating with the resource/object such as storage device 80 [See FIGS. 5A–E]. In the alternative, if determination is reached in decision process 408 that the primary server is no longer communicating with the resource/object, then control is passed to the process 410. In process 410 the user is notified of the failure of a primary server. The notification occurs through the cooperative operation of modules 328, 322 and 308 discussed above in connection with FIG. 7. Control is then passed to process 412. In process 412 the secondary server activates the object and passes control to process 414. In process 414 the secondary server mounts the object i.e., physically assumes control over the object. Control is then passed to process 416 in which the secondary server writes into the host server property value 110A the value for its ID in place of the primary server ID. This new property value is then replicated across all enhanced network directory databases on all the servers in the enterprise. Thus, a failure has been detected and transparently to the user an alternate path for communications between workstations and the object, e.g. storage device 80, through the secondary server, e.g. server 54. [See FIGS. 5A–E]. Control then passes to process 418 in which the object is reserved by the backup server.

Although in the example shown in FIGS. 5A–E the object backed up is a storage device, the invention can be applied with equal benefit to many objects including but not limited to: a printer, a print queue, a directory and a database.

FIG. 8C details the recovery and fail-back processes on the servers which have a primary and backup relationship with respect to a specific object being processed. The server which has a backup relationship initiates the recovery fail-back process at splice block D. Control then passes to process 458 in which the backup server initiates a LAN heartbeat to enable it to determine whether the primary server has resumed normal operation. This LAN beat was discussed above in connection with process 402 [see FIG. 8B]. Control is then passed to decision process 460. In decision process 460 a determination is made on the basis of the LAN beat as to whether or not the primary server has recovered. If this determination is in the negative, then control returns to process 458. Alternately, if the determination in made in the affirmative i.e., that the primary has recovered, then control passes to decision process 462.

In decision process 462, a determination is made as to whether the autorecover property value 218A [see FIG. 4] is enabled, i.e., boolean TRUE. In the event this determination is in the negative, then control is passed to process 464. In process 464, the user or network administrator is prompted with the news of a recovery and a request for direction as to whether to initiate fail-back. Control is then passed to decision process 466. In decision process 466 a determination is made as to whether the user response was in the affirmative. In the event that determination is in the negative, control returns to process 464. Alternately, if that determination is in the affirmative, i.e., the user has indicated that fail-back is appropriate, then control passes to process 468. Alternately, if in decision process 462 a determination is made in the affirmative, i.e., that autorecovery has been enabled, then control also passes to process 468. In process 468, the backup server dismounts the object. An object dismount is accomplished by the backup server through the cooperative interaction of data manager module 328 and Vol-Lib module 312. [See FIG. 7] Control then passes to process 470. In process 470, the backup server deactivates the object. Control is then passed to process 472 in which the object is released. Control then passes to splice block B.

The processes for recovery and fail back as performed on a server designated as primary with respect to a specific object being processed commences at splice block C. Control then passes to decision process 444. In decision process 444 a primary reboot passes control to process 446. In process 446 the data manager module acting through the vol-lib module [see FIG. 7] obtains all objects which have a primary server ID corresponding to the server running the process. Control is then passed to decision process 450. In decision process 450 objects which are reserved are bypassed by passing control to process 448 for selection of the next object. As to those objects which are not reserved control passes to process 452. In process 452 the object is activated. Control is then passed to process 454 in which the object is mounted. Control is then passed to process 456 in which the primary server modifies the host server property value 110A [see FIG. 4] with respect to that object and writes its own ID into the host server property value. Control is then passed to splice block A.

The foregoing description of a preferred embodiment of the invention has been presented for purposes of illustration and description. It is not intended to be exhaustive or to limit the invention to the precise forms disclosed. Obviously many modifications and variations will be apparent to practitioners skilled in this art. It is intended that the scope of the invention be defined by the following claims and their equivalents.

Glossary

Fail-Over refers to the process of passing data flow control from a failed primary device to a substitute or backup device.

Fail-Back refers to the process of re-passing data flow control from a substitute or backup device to a primary device which has resumed operation.

Appendix A

Incorporation by Reference of Commonly Owned Applications

The following patent applications, commonly owned and filed Oct. 1, 1997, are hereby incorporated herein in their entirety by reference thereto:

| Title | Application No. | Attorney Docket No. |
|---|---|---|
| "System Architecture for Remote Access and Control of Environmental Management" | 08/942,160 | MNFRAME.002A1 |
| "Method of Remote Access and Control of Environmental Management" | 08/942,215 | MNFRAME.002A2 |
| "System for Independent Powering of Diagnostic Processes on a Computer System" | 08/942,410 | MNFRAME.002A3 |
| "Method of Independent Powering of Diagnostic Processes on a Computer System" | 08/942,320 | MNFRAME.002A4 |
| "Diagnostic and Managing Distributed Processor System" | 08/942,402 | MNFRAME.005A1 |
| "Method for Managing a Distributed Processor System" | 08/942,448 | MNFRAME.005A2 |

-continued

| Title | Application No. | Attorney Docket No. |
|---|---|---|
| "System for Mapping Environmental Resources to Memory for Program Access" | 08/942,222 | MNFRAME.005A3 |
| "Method for Mapping Environmental Resources to Memory for Program Access" | 08/942,214 | MNFRAME.005A4 |
| "Hot Add of Devices Software Architecture" | 08/942,309 | MNFRAME.006A1 |
| "Method for The Hot Add of Devices" | 08/942,306 | MNFRAME.006A2 |
| "Hot Swap of Devices Software Architecture" | 08/942,311 | MNFRAME.006A3 |
| "Method for The Hot Swap of Devices" | 08/942,457 | MNFRAME.006A4 |
| "Method for the Hot Add of a Network Adapter on a System Including a Dynamically Loaded Adapter Driver" | 08/943,072 | MNFRAME.006A5 |
| "Method for the Hot Add of a Mass Storage Adapter on a System Including a Statically Loaded Adapter Driver" | 08/942,069 | MNFRAME.006A6 |
| "Method for the Hot Add of a Network Adapter on a System Including a Statically Loaded Adapter Driver" | 08/942,465 | MNFRAME.006A7 |
| "Method for the Hot Add of a Mass Storage Adapter on a System Including a Dynamically Loaded Adapter Driver" | 08/962,963 | MNFRAME.006A8 |
| "Method for the Hot Swap of a Network Adapter on a System Including a Dynamically Loaded Adapter Driver" | 08/943,078 | MNFRAME.006A9 |
| "Method for the Hot Swap of a Mass Storage Adapter on a System Including a Statically Loaded Adapter Driver" | 08/942,336 | MNFRAME.006A-10 |
| "Method for the Hot Swap of a Network Adapter on a System Including a Statically Loaded Adapter Driver" | 08/942,459 | MNFRAME.006A-11 |
| "Method for the Hot Swap of a Mass Storage Adapter on a System Including a Dynamically Loaded Adapter Driver" | 08/942,458 | MNFRAME.006A-12 |
| "Method of Performing an Extensive Diagnostic Test in Conjunction with a BIOS Test Routine" | 08/942,463 | MNFRAME.008A |
| "Apparatus for Performing an Extensive Diagnostic Test in Conjunction with a BIOS Test Routine" | 08/942,463 | MNFRAME.009A |
| "Configuration Management Method for Hot Adding and Hot Replacing Devices" | 08/941,268 | MNFRAME.010A |
| "Configuration Management System for Hot Adding and Hot Replacing Devices" | 08/942,408 | MNFRAME.011A |
| "Apparatus for Interfacing Buses" | 08/942,382 | MNFRAME.012A |
| "Method for Interfacing Buses" | 08/942,413 | MNFRAME.013A |
| "Computer Fan Speed Control Device" | 08/942,447 | MNFRAME.016A |
| "Computer Fan Speed Control Method" | 08/942,216 | MNFRAME.017A |
| "System for Powering Up and Powering Down a Server" | 08/943,076 | MNFRAME.018A |
| "Method for Powering Up and Powering Down a Server" | 08/943,077 | MNFRAME.019A |
| "System for Resetting a Server" | 08/942,333 | MNFRAME.020A |
| "Method for Resetting a Server" | 08/942,405 | MNFRAME.021A |
| "System for Displaying Flight Recorder" | 08/942,070 | MNFRAME.022A |
| "Method for Displaying Flight Recorder" | 08/942,068 | MNFRAME.023A |

-continued

| Title | Application No. | Attorney Docket No. |
|---|---|---|
| "Synchronous Communication Interface" | 08/943,355 | MNFRAME.024A |
| "Synchronous Communication Emulation" | 08/942,004 | MNFRAME.025A |
| "Software System Facilitating the Replacement or Insertion of Devices in a Computer System" | 08/942,317 | MNFRAME.026A |
| "Method for Facilitating the Replacement or Insertion of Devices in a Computer System" | 08/942,316 | MNFRAME.027A |
| "System Management Graphical User Interface" | 08/943,357 | MNFRAME.028A |
| "Display of System Information" | 08/942,195 | MNFRAME.029A |
| "Data Management System Supporting Hot Plug Operations on a Computer" | 08/942,129 | MNFRAME.030A |
| "Data Management Method Supporting Hot Plug Operations on a Computer" | 08/942,124 | MNFRAME.031A |
| "Alert Configurator and Manager" | 08/942,005 | MNFRAME.032A |
| "Managing Computer System Alerts" | 08/943,356 | MNFRAME.033A |
| "Computer Fan Speed Control System" | 08/940,301 | MNFRAME.034A |
| "Computer Fan Speed Control System Method" | 08/941,267 | MNFRAME.035A |
| "Black Box Recorder for Information System Events" | 08/942,381 | MNFRAME.036A |
| "Method of Recording Information System Events" | 08/942,164 | MNFRAME.037A |
| "Method for Automatically Reporting a System Failure in a Server" | 08/942,168 | MNFRAME.040A |
| "System for Automatically Reporting a System Failure in a Server" | 08/942,384 | MNFRAME.041A |
| "Expansion of PCI Bus Loading Capacity" | 08/942,404 | MNFRAME.042A |
| "Method for Expanding of PCI Bus Loading Capacity" | 08/942,223 | MNFRAME.043A |
| "System for Displaying System Status" | 08/942,347 | MNFRAME.044A |
| "Method of Displaying System Status" | 08/942,071 | MNFRAME.045A |
| "Fault Tolerant Computer System" | 08/942,194 | MNFRAME.046A |
| "Method for Hot Swapping of Network Components" | 08/943,044 | MNFRAME.047A |
| "A Method for Communicating a Software Generated Pulse Waveform Between Two Servers in a Network" | 08/942,221 | MNFRAME.048A |
| "A System for Communicating a Software Generated Pulse Waveform Between Two Servers in a Network" | 08/942,409 | MNFRAME.049A |
| "Method for Clustering Software Applications" | 08/942,318 | MNFRAME.050A |
| "System for Clustering Software Applications" | 08/942,411 | MNFRAME.051A |
| "Method for Automatically Configuring a Server after Hot Add of a Device" | 08/942,319 | MNFRAME.052A |
| "System for Automatically Configuring a Server after Hot Add of a Device" | 08/942,331 | MNFRAME.053A |
| "Method of Automatically Configuring and Formatting a Computer System and Installing Software" | 08/942,412 | MNFRAME.054A |
| "System for Automatically Configuring and Formatting a Computer System and Installing Software" | 08/941,955 | MNFRAME.055A |
| "Determining Slot Numbers in a Computer" | 08/942,462 | MNFRAME.056A |
| "System for Detecting Errors in a Network" | 08/942,169 | MNFRAME.058A |

-continued

| Title | Application No. | Attorney Docket No. |
|---|---|---|
| "Method of Detecting Errors in a Network" | 08/940,302 | MNFRAME.059A |
| "System for Detecting Network Errors" | 08/942,407 | MNFRAME.060A |
| "Method of Detecting Network Errors" | 08/942,573 | MNFRAME.061A |

What is claimed is:

1. A method for fault tolerant access to a network resource, on a network with a client workstation and a first and a second server, said method for fault tolerant access comprising the acts of:

selecting a first server to provide communications between a client workstation and a network resource;

detecting a failure of the first server, comprising the acts of:

monitoring across a common bus, at a second server, communications between the first server and the network resource across the common bus by noting a continual change in state of the network resource, and observing a termination in the communications between the first server and the network resource across the common bus by noting a stop in the continual change in state of the network resource; and routing communications between the client workstation and the network resource via the second server.

2. The method for fault tolerant access to a network resource of claim 1, further comprising the acts of:

identifying in a first record, the primary server for the network resource as the first server;

discovering a recovery of the first server; and re-routing communications between the client workstation and the network resource via the first server.

3. The method for fault tolerant access to a network resource of claim 2, further comprising providing a network resource database; and replicating the network resource database on the first and the second servers.

4. The method for fault tolerant access to a network resource of claim 2, wherein said act of detecting a recovery of the first server, further includes the acts of:

sending packets intermittently from the second server to the first server; and re-acquiring acknowledgments from the first server at the second server, the acknowledgments responsive to said sending act and to the recovery of said first server.

5. The method for fault tolerant access to a network resource of claim 1, further comprising:

choosing the first server as the primary server and the second server as the backup server, for the network resource; and storing in a first field of the first record the primary server for the network resource and sorting in a second field of the first record the backup server for the network resource.

6. The method for fault tolerant access to a network resource of claim 5, wherein said choosing act, includes the act of:

allowing a network administrator to select the primary and the backup server.

7. The method for fault tolerant access to a network resource of claim 5, wherein said act of detecting a failure of the first server, further includes the acts of:

reading the second field in the first record of the network resource database;

determining on the basis of said reading act that the second field identifies the backup server for the network resource as the second server;

activating the monitoring by the second server of the first server, in response to said determining act; and ascertaining at the second server a failure of the first server.

8. The method for fault tolerant access to a network resource of claim 6, wherein said act of ascertaining at the second server a failure of the first server, further includes the acts of:

sending packets intermittently from the second server to the first server;

receiving acknowledgments from the first server at the second server, the acknowledgments responsive to said sending act; and noticing a termination in the receipt of acknowledgments from the first server.

9. The method for fault tolerant access to a network resource of claim 5, wherein said act of recognizing the backup server for the network resource, further includes the acts of:

reading the second field in the first record of the network resource database; and determining that the second field identifies the backup server for the network resource as the second server.

10. A program storage device encoding instructions for:

causing a computer to provide a network resource database, the database including individual records corresponding to network resources, and the network resource database including a first record corresponding to the network resource and the first record identifying a primary server for the network resource as a first server;

causing a computer to select, on the basis of the first record, the first server to provide communications between a client workstation and the network resource;

causing a computer to recognize the backup server for the network resource as the second server;

causing a computer to detect a failure of the first server, including:

causing a computer to monitor across a common bus, at the second server, communications between the first server and the network resource across the common bus by noting a continual change in state of the network resource, and causing a computer to observe a termination in the communications between the first server and the network resource across the common bus by noting a stop in the continual change in state of the network resource; and causing a computer to route communications between the client workstation and the network resource via the second server, responsive to said recognizing and detecting acts.

11. The program storage device of claim 10, further comprising instructions for:

causing a computer to identify in the first record, the primary server for the network resource as the first server;

causing a computer to discover a recovery of the first server; and causing a computer to re-route communications between the client workstation and the network resource via the first server, responsive to said identifying and discovering acts.

12. The program storage device of claim 11, further including instructions for:

causing a computer to replicate a network resource database on the fist and the second server.

13. The program storage device of claim 11, wherein said instructions for causing a computer to detect a recovery of the first server, further includes instructions for:

causing a computer to send packets intermittently from the second server to the first server; and causing a computer to acquire acknowledgments from the first server at the second server, the acknowledgments responsive to said sending act and to the recovery of the first server.

14. The program storage device of claim 13, further including instructions for:

causing a computer to choose the first server as the primary server and the second server as the backup server, for the network resource; and causing a computer to store in a first field of the first record the primary server for the network resource and storing in a second field of the first record the backup server for the network resource.

15. The program storage device of claim 14, wherein said instructions for causing a computer to choose, further include:

causing a computer to allow a network administrator to select the primary and the backup server.

16. The program store device of claim 14, wherein said instructions for causing a computer to detect a failure of the first server further include instructions for:

causing a computer to read the second field in the first record of the network resource database;

causing a computer to determine on the basis of said reading act that the second field identifies the backup server for the network resource as the second server;

causing a computer to activate the monitoring by the second server of the first server, in response to said determining act; and causing a computer to ascertain at the second server a failure of the first server.

17. The program storage device of claim 16, wherein said instructions for causing a computer to ascertain at the second server a failure of the first server, further includes instructions for:

causing a computer to send packets intermittently from the second server to the first server;

causing a computer to receive acknowledgments from the first server at the second server, the acknowledgments responsive to said sending act; and causing a computer to notice a termination in the receipt of acknowledgments from the first server.

18. The program storage device of claim 14, wherein said instructions for causing a computer to recognize the backup server for the network resource, further include instructions for:

causing a computer to read the second field in the first record of the network resource database; and causing a computer to determine on the basis of said reading act that the second field identifies the backup server for the network resource as the second server.

19. A method for providing fault tolerant access to a network resource, on a network with a client workstation and a first and a second server and a network resource database, wherein the network resource database includes a first record corresponding to a network resource and the first record includes a first field containing the name of the network resource and a second field containing the host server affiliation of the network resource; said method for fault tolerant access comprising the acts of:

expanding the network resource database to include a third field for naming the primary server affiliation for the network resource and a fourth field for naming the backup server affiliation for the network resource;

naming the first server in the third field;

selecting, on the basis of the first record, the first server to provide communications between the client workstation and the network resource;

naming the second server in the fourth field;

recognizing, on the basis of the fourth field of the first record, the backup server for the network resource as the second server;

detecting a failure of the first server, including the acts of:

monitoring across a common bus, at the second server, communications between the first server and the network resource across the common bus by noting a continual change in state of the network resource, and observing a termination in the communications between the first server and the network resource across the common bus by noting a stop in the continual change in state of the network resource; and routing communications between the client workstation and the network resource via the second server, responsive to said recognizing and detecting acts.

20. The method for fault tolerant access to a network resource of claim 19, further comprising the acts of:

monitoring the server named in the third field;

discovering a recovery of the server named in the third field; and re-routing communications between the client workstation and the network resource via the first server, responsive to said monitoring and discovering acts.

21. The method for fault tolerant access to a network resource of claim 20, wherein said act of discovering a recovery of the first server, further includes the acts of:

sending packets intermittently from the second server to the first server; and re-acquiring acknowledgments from the first server at the second server, the acknowledgments responsive to said sending act and to the recovery of said first server.

22. The method for fault tolerant access to a network resource of claim 19, wherein said naming acts, include the acts of:

allowing a network administrator to name the primary server affiliation and the backup server affiliation in the third and fourth fields of the first record of the network resource database.

23. The method for fault tolerant access to a network resource of claim 19, wherein said act of detecting a failure of the first server, further includes the acts of sending sending packets intermittently from the second server to the first server;

receiving acknowledgments from the first server at the second server, the acknowledgments responsive to said sending act; and noticing a termination in the receipt of acknowledgments from the first server.

24. A computer usable medium having computer readable program code means embodied therein for causing fault tolerant access to a network resource on a network with a client workstation and a first and second server, and a network resource database, wherein the network resource database includes a first record corresponding to a network resource and the first record includes a first field containing the name of the network resource and a second field containing the host server affiliation of the network resource; the computer readable program code means in said article of manufacture comprising;

computer readable program code means for causing a computer to expand the network resource database to include a third field for naming the primary server affiliation for the network resource and a fourth field for naming the backup server affiliation for the network resource;

computer readable program code means for causing a computer to name the first server in the third field;

computer readable program code means for causing a computer to select, on the basis of the first record, the first server to provide communications between the client workstation and the network resource;

computer readable program code means for causing a computer to name the second server in the fourth field;

computer readable program code means for causing a computer to recognize, on the basis of the fourth field of the first record, the backup server for the network resource as the second server;

computer readable program code means for monitoring across a common bus, at a second server, communications between the first server and the network resource across the common bus by noting a continual change in state of the network resource, and observing a termination in the communications between the first server and the network resource across the common bus by noting a stop in the continual change in state of the network resource; and computer readable program code means for causing a computer to route communications between the client workstation and the network resource via the second server, responsive to said recognizing and detecting acts.

25. The computer readable program code means in said article of manufacture of claim 24, further comprising:

computer readable program code means for causing a computer to monitor the server named in the third field;

computer readable program code means for causing a computer to discover a recovery of the server named in the third field; and computer readable program code means for causing a computer to re-route communications between the client workstation and the network resource via the first server, responsive to said monitoring and discovering acts.

26. The computer readable program code means in said article of manufacture of claim 25, wherein said computer readable program code means for causing a computer to discover a recovery, further includes:

computer readable program code means for causing a computer to send packets intermittently from the second server to the first server; and computer readable program code means for causing a computer to re-acquire acknowledgments from the first server at the second server, the acknowledgments responsive to said sending act and to the recovery of said first server.

27. The computer readable program code means in said article of manufacture of claim 24, wherein said computer readable program code means for causing a computer to name, further includes:

computer readable program code means for causing a computer to allow a network administrator to name the primary server affiliation and the backup server affiliation in the third and fourth fields of the first record of the network resource database.

28. The computer readable program code means in said article of manufacture of claim 24, wherein said computer readable program code means for causing a computer to detect a failure, further includes:

computer readable program code means for causing a computer to send packets intermittently from the second server to the first server;

computer readable program code means for causing a computer to receive acknowledgments from the first server at the second server, the acknowledgments responsive to said sending act; and computer readable program code means for causing a computer to notice a termination in the receipt of acknowledgments from the first server.

* * * * *

UNITED STATES PATENT AND TRADEMARK OFFICE
CERTIFICATE OF CORRECTION

PATENT NO.    : 6,292,905 B1
DATED         : September 18, 2001
INVENTOR(S)   : Wallach et al.

It is certified that error appears in the above-identified patent and that said Letters Patent is hereby corrected as shown below:

<u>Title page,</u>
Item [22], filed date reads "Oct. 2, 1997", should read -- Oct. 1, 1997 --.

<u>Column 19,</u>
Line 10, which reads, "the fist", should read -- the first --.
Line 34, which reads, "store", should read -- storage --.

<u>Column 20,</u>
Lines 62-63, which reads, "sending sending", should read -- sending --.

Signed and Sealed this

Twenty-second Day of April, 2003

JAMES E. ROGAN
*Director of the United States Patent and Trademark Office*